United States Patent [19]

Freedman et al.

[11] Patent Number: 4,916,616

[45] Date of Patent: Apr. 10, 1990

[54] SELF-CONSISTENT LOG INTERPRETATION METHOD

[75] Inventors: Robert Freedman, Houston; John E. Puffer, Sugarland, both of Tex.

[73] Assignee: BP Exploration, Inc., Houston, Tex.

[21] Appl. No.: 939,400

[22] Filed: Dec. 8, 1986

[51] Int. Cl.[4] .............................................. G06F 15/20
[52] U.S. Cl. .................................. 364/422; 364/153; 324/351; 73/152
[58] Field of Search .................. 364/422, 153; 73/152; 324/351; 346/33 WL

[56] References Cited

U.S. PATENT DOCUMENTS

| | | | |
|---|---|---|---|
| 3,781,533 | 12/1973 | Barnstone et al. | 364/153 |
| 3,828,171 | 8/1974 | Griffin | 364/153 |
| 4,245,313 | 1/1981 | Coates | 73/152 |
| 4,314,338 | 2/1982 | Suau et al. | 364/422 |
| 4,314,339 | 2/1982 | Kenyon | 364/422 |
| 4,338,664 | 7/1982 | Mayer | 364/422 |
| 4,340,934 | 7/1982 | Segesman | 364/422 |
| 4,617,825 | 10/1986 | Ruhovets | 73/152 |

OTHER PUBLICATIONS

M. J. Box, "A Comparison of Several Current Optimization Methods, and the Use of Transformations in Constrained Problems", pp. 67–77.

Aird, Thomas J. and Rice, John R., "Systematic Search in High Dimensional Sets", SIAM J. Number. Anal., vol. 14, No. 2, Apr. 1977, pp. 296–312.

R. Fletcher, "Fortran Subroutines for Minimization by Quasi-Newton Methods", U.K. Atomic Energy Authority Research Group, (1972), pp. 1–29.

Primary Examiner—John R. Lastova
Attorney, Agent, or Firm—Pravel, Gambrell, Hewitt, Kimball & Krieger

[57] ABSTRACT

Responses of subsurface formations adjacent a well borehole are obtained from a number of types of well logs. The well logs typically include a resistivity log, a gamma ray log, a density log, a neutron log and an induction or electromagnetic wave log. Parameters of interest are determined in evaluating whether the subsurface formations are of interest for petroleum contents by a non-linear programming technique based on the log responses obtained. The parameters of interest are maintained self-consistent, i.e. their contribution to log measurements is based on the same value for the parameter in its effect on each log in which they produce a response.

23 Claims, 15 Drawing Sheets

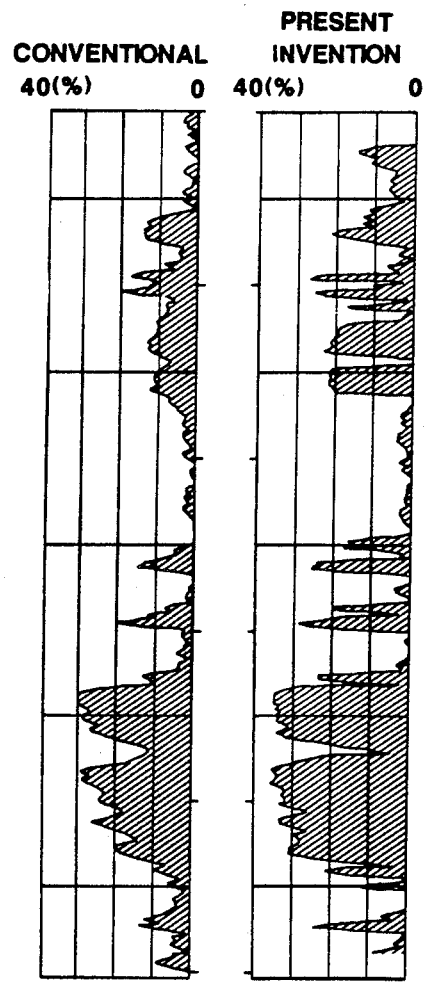
F I G. 14

SELF-CONSISTENT LOG INTERPRETATION METHOD

BACKGROUND OF INVENTION

1. Field of Invention:

The present invention relates to obtaining measures of parameters of interest concerning possible petroleum content of subsurface formations.

2. Description of the Prior Art:

In assessing possible petroleum deposits in a subsurface formation adjacent a well borehole, certain parameters of the formation have long been of particular interest. They typically include water saturation, both of the uninvaded formation and the flushed zone adjacent the borehole; shale (or other rock) volume fraction of the formation; porosity of the formation; and hydrogen index of the formation constituents. None of these parameters, however, is directly measurable, so far as is known. A number of types of well logging tools and methods exist for obtaining responses of the formation to the particular logging tool used. Several parameters of interest typically contribute to each of the various types of log measurements obtained, usually in a non-linear fashion. Further, the contribution of a parameter of interest is often of a different nature in different types of logs obtained.

Conventional formation evaluation methods generally relied on "multiple pass" solutions which were inherently piecemeal. These methods were not self-consistent, which frequently led to incorrect solutions, such as water saturations greater than 100 percent or negative porosities. The conventional methods are well-known and have been extensively discussed in the literature.

U.S. Pat. No. 4,338,664 represented an attempt to determine the value of parameters of interest form a set of logging measurements. The method described in this patent relied on a computation technique which introduced an incoherence function, $G(\vec{x})$, which was defined by:

$$G(\vec{x}) = F(\vec{x}) + \sum_{k=1}^{n} \frac{(\bar{g}_k(\vec{x}))^2}{\tau_k^2} \quad (1)$$

where $F(\vec{x})$ is an error function representing the sum of differences between the calculated data values and the actually measured values of the data, divided by a weighting factor. In Equation (1), the terms in the summation were termed penalty functions which are added to impose, for example, constraints of the form:

$$g_k(\vec{x}) \geq 0 \quad (2)$$

The parameters $\tau_k$ in this penalty function are auxiliary parameters which were not well-defined. That is, there was no systematic procedure for assigning values to the $\tau_k$, which was one of the disadvantages of this method. The function $\bar{g}_k(\vec{x})$ was set equal to zero if the constraint was obeyed and $\bar{g}_k = g_k$ if the constraint was not obeyed.

The method of this patent thus used what is known in non-linear programming as an unconstrained minimization method (e.g., Fletcher-Powell) to obtain the minimum of the auxiliary function $G(\vec{x})$ with respect to $\vec{x}$ (e.g., the vector $\vec{x}$ denotes a set of reservoir properties).

Let $\vec{x}^{+}$ denote the value of $\vec{x}$ which minimizes $G(\vec{x})$. In the penalty function method, it can be proven that:

$$\lim_{\tau_k \to 0} \vec{x}^{+} = \vec{x}^{*} \quad (3)$$

for $\tau_1, \tau_2, \ldots \tau_n$, where $\vec{x}^{*}$ is the value of $\vec{x}$ which minimizes $F(\vec{x})$. In order to properly apply the penalty function method, however, the procedures outlined below had to be followed:

(1) Select a set a values $\tau_k$ and an initial guess for the solution $\vec{x}_1^{+}$;

(2) Find $\vec{x}^{+}$ using the Fletcher-Powell minimization method, (3) Reduce the values of $\tau_k$ and return to step 2 using $\vec{x}^{+}$ as the initial guess. Continue this process until reduction of $\tau_k$ does not significantly alter the value of $\vec{x}^{+}$. Then, using Equation (3), one could accept $\vec{x}^{+}$ as an accurate estimate of $\vec{x}^{*}$.

The procedure described above was inefficient in that it required repeated application of the unconstrained minimization algorithm. The inefficiency resulted from the fact that convergence with respect to the $\tau_k$ had to be achieved, obtaining the minimum of the error function $F(\vec{x})$ by an indirect and inefficient procedure.

SUMMARY OF INVENTION

Briefly, the present invention provides a new and improved method of determining the values of parameters of subsurface formations of interest in petroleum exploration and production. The values or measures of these parameters are obtained from measurements obtained by a well logging tool, whether a composite tool capable of obtaining several types of well log readings in a single run in the well bore, or individual tools run separately in the well bore at different times.

The well logging measurements are obtained in subsurface formations adjacent a well bore. The measurements once obtained are stored in a data memory. A suite of response equations are established in which the measurements obtained are expressed as functions of the parameters indicative of petroleum content of the formations. The parameters indicative of petroleum content are constrained to have self-consistent values through the suite of response equations.

The self-consistency of the method of the present invention is twofold. First, the petrophysical model equations are written in terms of a set of consistently defined petrophysical variables. This avoids inconsistencies of the kind which result, for example, if "total porosity" is used in some of the equations and "effective porosity" is used in others. Secondly, the model equations are solved simultaneously and self-consistently without any unnecessary approximations. This avoids incorrect solutions of the kind which result, for example, when a shale volume is determined solely from a gamma-ray response when, in fact, it should be simultaneously determined from all the log responses.

Theoretical response values are calculated for the measurements obtained using an array of test sets of values for the constrained parameters indicative of petroleum content. A measure of the difference between the calculated theoretical response values and the measurements obtained for each of the array of test sets of values is then obtained. A determination is then made as to which one of the array of test sets of values produces the minimum measure of difference between the measurements obtained and the calculated theoretical response values. This allows a determination to be made to ascertain the most likely, self-consistent values of measures of the parameters indicative of petroleum content. These values, once ascertained, are then furnished in an output display.

BRIEF DESCRIPTION OF THE DRAWINGS

FIG. 14 is a comparative plot of porosity with an expanded scale, obtained according to the present invention and by conventional methods from the test example of FIGS. 6 and 7.

DESCRIPTION OF PREFERRED EMBODIMENT

I. NOMENCLATURE

Figure 1:
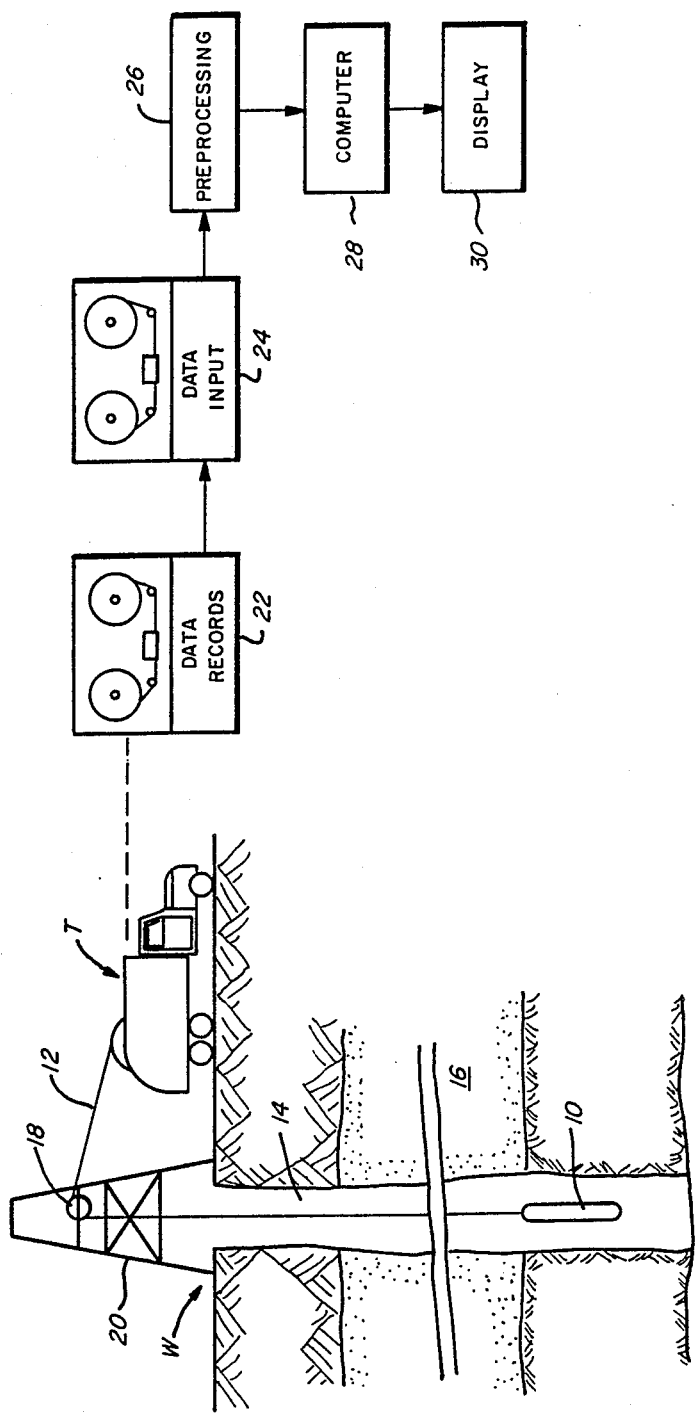
FIG. 1 is a schematic view, taken partly in cross-section, of a well logging operation in subsurface formations adjacent a well bore.

At the outset, for ease of understanding, the mathematical symbols used in the description of the present invention and their units of measure are set forth below:

| A. Arabic Symbols | |
|---|---|
| $A_t$ | Attenuation measured by an electromagnetic propagation tool - EPT - (dB/m). |
| $A_s$ | Contribution to $A_t$ resulting from spreading losses (dB/m). |
| $A_w$ | Contribution to $A_t$ resulting from mud filtrate (dB/m). |
| $A_{sh}$ | Attenuation measured in a shale zone. (dB/m). |
| $C_k$ | Concentration by weight of the k-th formation constituent. |
| $C_{mud}$ | Conductivity of the drilling mud at borehole temperature (mhos per meter). |
| $C_t$ | Conductivity of the uninvaded formation (mhos per meter). |
| D | Bitsize (inches). |
| DC | Differential caliper (inches). |
| F(x,s) | Error function describing the deviations of the measured log data from the model petrophysical response equations where the parameters s and x are defined below. |
| GR | Count rate from gamma-ray tool (API). |
| $(GR)_{cs}$ | Count rate from gamma-ray tool in a clean sand (API). |
| $(GR)_{sh}$ | Count rate from gamma-ray tool in a shale (API). |
| $H_k$ | Hydrogen index of the k-th constituent of the formation. |
| K | Concentration by weight of potassium in the formation as determined by a spectral gamma-ray tool (percent). |
| $K_k$ | Percent potassium by weight in the k-th formation constituent. |
| m | Cementation exponent. |
| n | Saturation exponent. |
| PPG | Mud weight in pounds per gallon. |
| $P_{mf}$ | Salinity of mud filtrate in ppm $\times 10^{-6}$. |
| $\vec{R}_i(x,s)$ | Theoretical response function for the i-th logging measurement in a suite of logs (note that the units of $R_i$ are those of the quantity being measured). The parameters s and x are defined below. |
| $R_t$ | Resistivity of uninvaded formation (ohm-m). |
| $R_{xo}$ | Resistivity of invaded zone (ohm-m). |
| $R_{sh}$ | Resistivity of a shale zone (ohm-m). |
| $R_w$ | Formation water resistivity at formation temperature (ohm-m). |
| s | An index used to denote depth. |
| $(S_w)_{irr}$ | Irreducible water saturation. |
| $S_w$ | Water saturation in the uninvaded formation (decimal). |
| $S_{xo}$ | Water saturation in the flushed zone investigated by an $R_{xo}$ tool (decimal). |
| $S_{EPT}$ | Water saturation in the flushed zone investigated by an EPT (decimal). |
| $t_{pl}$ | Traveltime measured by the EPT tool (ns/m). |
| $t_{pw}$ | Traveltime of mud filtrate or brine within the depth of investigation of the EPT as a function of temperature and salinity (ns/m). |
| $t_{ph}$ | Traveltime of hydrocarbon within the depth of investigation of the EPT (ns/m). |
| $t_{psh}$ | EPT traveltime in a shale zone (ns/m). |
| Th | Concentration by weight of thorium in the formation as determined by a spectral gamma-ray tool (ppm). |
| $Th_k$ | Parts per million by weight of thorium in the k-th formation constituent. |
| $V_{ma}$ | Volume fraction of matrix in the formation (decimal). |
| $V_{sh}$ | Volume fraction of shale in the formation (decimal). |
| $V_k$ | Volume fraction of k-th clay or other mineral in the formation. |
| $W(\sigma(y_i,s))$ | Weighting coefficients which are functions of the standard deviations in the logging data. |
| $\vec{x}$ | An m-dimensional vector whose elements ($x_i$, i = 1, m) are a set of m properties describing the reservoir. |
| $\vec{x}^*$ | The value of $\vec{x}$ for which the elements ($x_i^*$, i = 1, m) represent the best values of the reservoir properties (e.g., the answers obtained by the present invention). |
| $\vec{y}$ | An n-dimensional vector whose elements ($y_i$, 1 = 1, n) are a set of n logging measurements |

| B. Greek Symbols | |
|---|---|
| $\Delta\rho_b$ | Hydrocarbon correction to the density log (gm/cc). |
| $(\Delta\phi)_{ex}$ | Excavation correction to the neutron log (decimal). |
| $(\Delta\phi)_n$ | Total correction to the neutron log from the hydrocarbon and excavation effects (decimal). |
| $\rho_b$ | Formation bulk density measured by a density logging tool (gm/cc). |
| $\rho_{mf}$ | Mud filtrate density (gm/cc). |
| $\rho_{ma}$ | Matrix density (gm/cc). |
| $\rho_{sh}$ | Density log reading in a shale zone (gm/cc). |

-continued

| | B. Greek Symbols |
|---|---|
| $\rho_h$ | Hydrocarbon density (gm/cc). |
| $\rho_{cs}$ | Density log reading in a clean sand (gm/cc). |
| $\rho_k$ | Density of k-th clay or other mineral in the formation (gm/cc). |
| $\sigma(y_i)$ | Standard deviation in the ith logging measurement. |
| $\rho(x_i^*)$ | Standard deviation in the reservoir property $x_i^*$ (e.g., $\phi$, $S_w$, etc.) computed according to the present invention. |
| $\phi$ | Effective fluid filled formation porosity which does not contain micro-porosity associated with shales. |
| $\phi_n$ | Neutron porosity determined from log (decimal). |
| $(\phi_n)_{sh}$ | Neutron log reading in a shale (decimal). |

| | C. Subscripts |
|---|---|
| b | bulk (e.g., bulk density) |
| h | hydrocarbon |
| irr | irreducible |
| ma | matrix |
| mf | mud filtrate |
| n | neutron |
| sh | shale |
| t | uninvaded formation |
| w | water |
| xo | flushed zone |

II. BASIC IDEAS AND METHODOLOGY

In the drawings, a conventional well logging truck T is shown at a well W. A sonde 10 containing one or more well logging instruments is lowered by a conductive wireline cable 12 into a well bore 14 to obtain the responses of subsurface formations 16 to each of the well logging instruments in the sonde 10. It is preferable with the present invention that the following types of well logging measurements be obtained from the subsurface formations 16: a resistivity log; a gamma ray log; a density log; a neutron log; and an electromagnetic wave or induction log. It should be understood that the sonde 10 need not contain all of these logging instruments, and may contain one or more of such instruments. In the latter case, sufficient logging passes are made with different well logging tools to obtain well logging measurements of all desired types for formation depths of interest.

During the well logging runs, the sonde 10 and cable 12 are suitably supported such as by a sheave wheel 18 in a derrick 20. The well logging measurements obtained by the well logging instruments are recorded as functions of borehole depth in a suitable data memory 22. Once recorded, the well logging data measurements may be transferred as needed into a data input unit 24 of a data processing system D. The well logging data measurements are subjected to conventional preprocessing in a preprocessing unit 26 and then to a computer 28 for processing according to the present invention in a manner to be set forth below. The processed results from computer 28 are then available for analysis on a suitable display or plotter 30.

The responses of the various logging tools clearly depend on the reservoir properties of the geological formations 16 surrounding the borehole 14. The goal of log analysis is to determine the most accurate set of reservoir properties consistent with the logging tool responses and a petrophysical interpretive model.

The log interpretation problem can be formulated as the solution of a system of non-linear equations. That is, the response of each logging tool in a suite of independent log measurements can be represented by an approximate theoretical response function. The selection of the theoretical response functions is equivalent to choosing a specific petrophysical interpretive model. These theoretical response functions are mathematical functions of the reservoir properties (i.e., $S_w$, $\phi$, $V_{sh}$, etc.) which are sought to be determined. Consider a logging suite consisting of n independent log measurements and a set of theoretical response functions which depend functionally on a set of m unknown reservoir properties. This leads to a set of n coupled non-linear equations to be solved for the m unknown reservoir properties.

The difficulties encountered in solving the aforementioned system of equations are due to the following factors:

(a) The equations are non-linear in the reservoir properties and cannot be solved analytically (i.e., numerical methods are required for their solution), (b) The equations are coupled and must be solved simultaneously, (c) The number of equations (n) is not necessarily equal to the number of unknowns (m), and (d) The acceptable solutions must obey various equality and inequality conditions (e.g., $(S_w)_{irr} \leq S_w \leq 1$).

The method of the present invention overcomes the foregoing difficulties by recognizing that the solution of the system of equations described above is similar to a problem frequently encountered in optimization theory. This problem is the determination of the global minimum (or maximum) of a non-linear function of m independent variables which are subject to various equality and/or inequality constraint conditions. In optimization theory this problem is called a "non-linear programming" problem and sophisticated mathematical machinery has been developed for its solution.

In the method of the present invention, the solution of the system of n non-linear equations in m unknown reservoir properties is reduced to finding a mathematically defined term, known as a global minimum, of a scalar "error function". The error function is a measure of the departure of the actual logging data from the theoretical response functions. The values of the reservoir properties for which the error function attains its global minimum are determined using the methods of non-linear programming. The values of the reservoir properties for which the error function attains its global minimum are the most accurate values obtainable from the log data and petrophysical model.

III. MATHEMATICAL FORMULATIONS

The basic problem of well log interpretation can be described as follows. Suppose that at some measured depth level "s" in a borehole one has logging tool responses from a suite of n different logging devices. Let this set of measured data be represented by the n-dimensional vector $\vec{y}(s) = (y_1, y_2 \ldots, y_n)^T$ where the superscript (T) denotes the transpose. The responses of the various logging tools clearly depend upon the reservoir properties of the rock formations surrounding the borehole. Let the m-dimensional vector $\vec{x}(s) = (x_1, x_2, \ldots, x_m)^T$ represent a set of m reservoir properties.

The goal of log analysis is to determine the most accurate set of reservoir properties consistent with the logging tool responses. For each logging device, the tool response can be approximated by a theoretical response function $R_i(\vec{x}, s)$ for $i=1,n$. One is, therefore, led to consider a set of n approximate equations in m unknowns, e.g., $$R_i(\vec{x}, s) \approx y_i(s) \tag{4}$$

for $i=1,n$. The m unknown reservoir properties denoted by $\vec{x}(s)$ are to be determined by the simultaneous and self-consistent solution of the above equations. The reservoir properties $\vec{x}$ which are sought to be determined include, for example, $S_w$, $S_{xo}$, $\phi$, $V_{sh}$, $\rho_h$, etc. It should be noted that the above set of equations are non-linear in $\vec{x}$. Under certain conditions it is possible to find an exact unique solution of a set of non-linear equations if $m=n$. In the case where $n>m$ (an overdetermined system) an exact solution generally does not exist. In the case where $n<m$ (an undetermined system) there are too few equations and the solution is, therefore, not unique. In all of the aforementioned cases it is sensible to define the solution as that value $\vec{x}^*(s)$ which minimizes a scalar "error function" $F(\vec{x}, s)$ defined by $$F(\vec{x},s) = \sum_{i=1}^{n} W(\sigma(y_i,s))[R_i(\vec{x},s) - y_i(s)]^2 \tag{5}$$

where $W(\sigma(y_i,s))$ are weighting coefficients determined at each level s from the standard deviations in the logging data and the degree of confidence in the i-th response equation. Observe that the terms $[R_i(\vec{x},s) - y_i(s)]^2$ are the squares of the residuals in Equation (4). Note that $F(\vec{x}, s)$ describes the departure of the logging data from the model response equations. The minimization of $F(\vec{x}, s)$ with respect to $\vec{x}(s)$ then results in the best weighted least squares solutions of Equations (4). An exact solution corresponds to $F(\vec{x}^*, s)=0$. A byproduct of the above analysis are the set of theoretical logs $R_i(\vec{x}^*,s)$. It is interesting to note that if one assumes that the residuals, $R_i(\vec{x},s) - y_i(s)$, can be described by statistically independent Gaussian distributions with variances $\sigma^2(y_i, s)$, then the minimization of $F(\vec{x},s)$ is the "maximum likelihood estimate" and $\vec{x}^*$ is the most probable value of $\vec{x}$. Moreover, under this assumption one can easily prove that the weighting coefficients $W(\sigma(y_i, s)) = [\sigma^2(y_i, s)]^{-1}$. In practice the residuals are not describable by Gaussian distributions and the connection with the maximum likelihood estimate is only of academic interest. Nevertheless, the use of the inverse variances for the weighting coefficients at each level is sensible and is adopted with the present invention.

IV. NONLINEAR PROGRAMMING

In Equation (5) above, the parameters $\vec{x}$ are constrained by physical considerations. For example, in practice, considering a shaly sand model with $\vec{x}=(S_w, S_{xo}, S_{EPT}, V_{sh}, \phi, \rho_h)^T$, the following constraints can be imposed:

$$(S_w)_{irr} \leq S_w \leq 1 \tag{6a}$$

$$(S_w)_{irr} \leq S_{xo} \leq 1, \tag{6b}$$

$$(S_w)_{irr} \leq S_{EPT} \leq 1, \tag{6c}$$

$$S_{EPT} \geq S_{xo} \geq S_w, \tag{6d}$$

$$0 \leq \phi \leq \phi_{Max}, \tag{6e}$$

and $$\phi + V_{sh} \leq 1 \tag{6f}$$

$$V_{ma} = 1 - \phi - V_{sh} \tag{6g}$$

The above relationships impose both equality and inequality constraints on the model parameters.

The minimization of the function $F(\vec{x}, s)$ subject to constraints of the type described above is an example of a "nonlinear programming" problem. The general nonlinear programming problem is concerned with the optimization of a scalar function $G(\vec{x})$ such that values $\vec{x}^*$ are sought such that $G(\vec{x})$ attains its maximum or minimum value subject to constraints of the form, $$\vec{g}_1(\vec{x}) \leq 0 \tag{7a}$$

$$\vec{g}_2(\vec{x}) = 0 \tag{7b}$$

where $\vec{g}_1$ and $\vec{g}_2$ are vectors which are given functions of the m-dimensional vector $\vec{x}$. The hyperspace region defined by those points $\vec{x}$ satisfying the constraints is called the "feasible" region. The terminology nonlinear programming is used whenever the objective function [e.g., $G(\vec{x})$] or the constraints are nonlinear in the parameters $\vec{x}$. In parameter estimation problems the function $G(\vec{x})$ is usually some measure of the departure of a set of data from a theoretical model.

With the present invention, without loss of the general conditions outlined above, the discussion can be limited to minimization of $G(\vec{x})$ since maximization is equivalent to minimization of $-G(\vec{x})$. In Equation (5) above, the "global" or "absolute" minimum of $F(\vec{x}, s)$ is sought within the feasible hyperspace region defined by the constraints. A point $\vec{x}^*$ is said to be a "local" minimum of $G(\vec{x})$ if in some neighborhood (e.g., a hypersphere) surrounding $\vec{x}^*$ there is no point $\vec{x}^{}$ in the feasible region such that $G(\vec{x}^{}) < G(\vec{x}^*)$. A point $\vec{x}^*$ is a "global or absolute minimum" of $G(\vec{x})$ if there is no point $\vec{x}^{}$ in the feasible region such that $G(\vec{x}^{}) < G(\vec{x}^*)$. Clearly, any global minimum is also a local minimum by definition; however, the converse is not true. A global minimum can occur in the interior or on the boundaries of the feasible region and the gradient of $G(\vec{x})$ need not vanish at a constrained global minimum as is the requirement in an unconstrained optimization problem.

V. METHOD FOR ACHIEVING A CONSTRAINED GLOBAL MINIMUM

There are two basic approaches in the mathematical programming literature for achieving constrained minimization when there are inequality constraints which must be satisfied. One approach involves the construction of "penalty functions". These functions are constructed so that they become very large for values of $\vec{x}$ near the boundaries of the feasible region and are negligibly small for values of $\vec{x}$ well within the feasible region. An auxiliary objective function is then constructed by adding the penalty functions to the original objective function. Methods of unconstrained optimization are then applied to the auxiliary function which is essentially identical to the original objective function within the feasible region. The penalty function method for inequality constraints is a generalization of the well-known Lagrange multiplier methods for minimizing functions subject to equality constraints. The method of U.S. Pat. No. 4,338,664 employs a penalty function method and has been discussed above.

With the present invention, in contrast, a different and more efficient method for handling the inequality constraints has been developed. This method involves transforming the independent variables $\vec{x}$ into a new set $\vec{x}'$ via a mathematical transformation of the form:

$$\vec{x}' = \vec{N} \vec{x} \tag{8}$$

where $\vec{N}$ is the operator (generally nonlinear) which defines the transformation. The object of the transformation is to transform the constrained problem with respect to the original variables $\vec{x}$ into an unconstrained problem in terms of the $\vec{x}'$. For example, in petrophysics constraints are frequently encountered where independent variables $x_i$ have constant upper and lower bounds $a_i \leq x_i \leq b_i$, so that the feasible region for these variables is a "box" in hyperspace. The following transformation $$x_i = a_i + (b_i - a_i) \sin^2 x_i', \tag{9}$$

permits one to seek an unconstrained minimum in $\vec{x}'$-space. This transformation has been discussed in computer programming literature, see Box, M. J.: "A Comparison of Several Current Optimization Methods, and the Use of Transformations in Constrained Problems", Computer Journal, Vol. 9, 1966, pp. 67–77. Note that the transformation approach does not alter the objective function. The transformations are faithful in the sense that $\vec{x}^*$ is obtained by the inverse transformation, $$\vec{x}^* = \vec{N}^{-1}(\vec{x}')^*. \tag{10}$$

The periodicity of the solutions in $\vec{x}'$-space under the transformation (9) poses no problem provided that the step length used by the unconstrained minimization algorithm is small compared to the period. Other constraints such as an upper bound on the sum of two or more independent variables can be easily managed by additional transformations. As an example, consider the constraint (6f) which requires that $\phi + V_{sh} \leq 1$. Let $$x_1 = \phi, \tag{11a}$$

$$x_2 = V_{sh}, \tag{11b}$$

and introduce the linear transformation, $$x_1' = x_1, \tag{12a}$$

$$x_2' \; x_1 + x_2. \tag{12b}$$

Clearly if the constraint is imposed that $x_2' \leq 1$ (e.g. by use of Equation (9)) then the constraint on original variables, $x_1 + x_2 \leq 1$, is automatically satisfied. The only difficulty that remains, however, is that $x_2 = x_2' - x_1'$ could become negative. This is not permissible since that would mean that $V_{sh} < 0$ which is not allowed. This possibility can be eliminated by requiring, for example, that $x_2' \geq (\phi)_{Max} + (V_{sh})_{Min}$. The foregoing transformations and generalizations of them appear to offer a more efficient and foolproof scheme for solving nonlinear programming problems than the penalty function method.

Once the above transformations have been applied to the error function in Equation (5) then an unconstrained minimization with respect to the transformed variables is performed. The unconstrained minimization algorithm used is described in Fletcher: "Fortran Subroutines For Minimization by Quasi-Newton Methods", Atomic Energy Research Establishment Report No. R7125, Harwell, England, Jun. 1972, pp. 1–29 and is a quasi-Newton method which only requires specification of the objective function. The method assumes that the gradient vector (VF) and the Hessian matrix $G = (\partial^2 F / \partial x_i \partial x_j)$ exist. This method, like most other optimization schemes, results in a "local minimum" which is not necessarily the global minimum which is sought. That is, the solution is obtained from a specified initial solution by an iterative algorithm. The solution to which the algorithm converges depends on the specified initial solution. This is one of the deficiencies in the penalty function method, which obtains a minimum from a single user specified initial solution. The convergence assumes that the initial solution is sufficiently close to the actual solution. In difficult log interpretation environments such starting points are frequently not available.

In order to correct the above deficiency of the penalty function method and to increase the probability of achieving a global minimum, the method of the present invention uses a large number of well chosen start points. The points are chosen automatically using a systematic search algorithm, as described in Aird, T. J. and Rice, J. R.: "Systematic Search in High Dimensional Sets", SIAM Journal on Numerical Analysis, Vol. 14, No. 2, 1977, pp. 296–312. the quasi-Newton method is applied to all of the starting points and, for example, five to ten initial iterations are performed. The a specified number of points (say five), which give the lowest values of the objective function after the initial iterations, are allowed to continue iterating until convergence is achieved. The point $\vec{x}^*$ which then results in the lowest value of $F(\vec{x}, s)$ is taken to be the global minimum. This procedure increases the probability that $\vec{x}^*$ is the true global minimum.

VI. CALCULATION OF THE STANDARD DEVIATIONS IN THE PARAMETER ESTIMATES

Application of the algorithm discussed above to Equation (5) subject to constraints of the form (7) leads to a value $\vec{x}^*$ for which $F(\vec{x}^*, s)$ is a global minimum. In other words, this algorithm can be viewed as a mapping which when given a suite of n log measurements, $\vec{y} = [y_1, y_2, \ldots, y_n]^T$, and their standard deviations, $\vec{\sigma}(y) = [\sigma(y_1), \sigma(y_2), \ldots, \sigma(y_n)]^T$, produces a solution $\vec{x}^*$ such that $F(\vec{x}^*, s)$ is the global minimum of $F(\vec{x}, s)$ within the feasible region. Assuming that $\sigma(y_k)/y_k << 1$ and that the $y_k$ are statistically independent, then the variances $\vec{\sigma}^2(x)$ in the parameters $\vec{x}^*$ are given by, $$\vec{\sigma}^2(x^*) = \sum_{k=1}^{n} \left( \frac{\partial \vec{x}^*}{\partial y_k} \right)^2 \sigma^2(y_k) \tag{13}$$

The partial derivatives can be evaluated numerically using the mapping algorithm discussed above. That is, finite differences can be used to write:

$$\frac{\partial \vec{x}^*}{\partial y_k} = \lim_{\Delta y_k \to 0} \frac{\vec{x}^*(y_k + \Delta y_k) - \vec{x}^*(y_k)}{\Delta y_k} \tag{14}$$

for $k = 1, n$. Observe that in order to calculate both $\vec{x}^*$ and $\vec{\sigma}^2(\vec{x}^*)$, the mapping must be applied at least $n+1$ times. Thus, calculation of the standard deviations in the answers requires at least $n+1$ times more computations than required to obtain only the answers. In practice, in order to obtain convergence of the derivatives in Equation (14), it might be necessary to apply the mapping p.(n+1) times where p is an iteration index such that $1 \leq p \leq p_{max}$ where $p_{max}$ is the maximum number of iterations permitted. It has been found in practice that $p_{max}$ can be as large as 10. Therefore, unless computer time is unlimited one should only compute the standard deviations in the answers over select intervals of interest.

VII. ADJACENT LEVEL EFFECTS

In the foregoing discussion, it has been assumed that the measured log responses $\vec{y}(s)$ at each depth s are affected only by the formation properties $\vec{x}^*(s)$ at that same depth s. This picture is valid only in a homogenous medium or if the logging tool responses are infinitely sharp. Clearly, neither of these criteria are satisfied in practice. Indeed, modern multi-coil induction sondes are influenced by contributions from beds at least thirty feet from the tool center.

The failure to recognize the adjacent level effects on the tool responses is another shortcoming in the penalty function method. These effects must be properly accounted for in order to obtain accurate values $\vec{x}^*(s)$ of the formation properties at each depth s. Moreover, proper treatment of adjacent level effects enhances thin-bed resolution. The likelihood of missing low resistivity and/or thin pay zones is lessened.

The method of the present invention accounts for adjacent level effects by a generalization of equation (4). The i-th logging tool response $y_i(s_o)$ at depth $s_o$ is related to the formation properties at adjacent levels $s_j$ via the set of equations, $$\sum_{j=-N_{1i}}^{N_{2i}} R_i(\vec{x}(s_j),s_j) C_{ij} = y_i(s_o), \quad (15)$$

for i=1, 2 ..., n. The above expressions are a set of linear response equations where the coefficients $C_{ij}$ are analogous to vertical geometrical factors. The physics of the logging tool responses is contained in the coefficients $C_{ij}$. The previous results are recovered if $C_{ij}=\delta_{jo}$ (e.g., a Kronecker delta) for i=1, 2, ..., n which corresponds to infinitely sharp vertical resolution. The level of complexity has increased since Equation (15) represents a set of n-equations in $(N_{1i}+N_{2i}+1) \cdot m$ unknowns which in practice is a highly undetermined system of equations. In order to overcome this difficulty, one can introduce the following approximation. Replace $\vec{x}(s_j)$ for $j \neq 0$ by their "zeroth-order" values obtained by neglecting adjacent level effects. Then solve for the remaining $\vec{x}^*(s_o)$ by global minimization of the "generalized error function", $$F(\vec{x},s_o) = \sum_{i=1}^{n} \left[ y_i(s_o) - \sum_{j=-N_{1i}}^{N_{2i}}{}' C_{ij} R_i(\vec{x}^*(s_j),s_j) - C_{io} R_i(\vec{x}(s_o),s_o) \right]^2 \quad (16)$$

where the prime on the summation means that the j=0 term is to be excluded. This approximation essentially "subtracts out" the contributions from adjacent levels. It is a sensible approximation provided that $C_{io} >> C_{ij}$ (for j=0) which is the situation in practice. It is analogous to treatment of adjacent level effects using a first order perturbation theory. The coefficients $C_{ij}$ are normalized to unity. Application of the previously discussed algorithm to Equation (16) leads to reservoir properties $\vec{x}^*(s)$ which are corrected for adjacent level effects.

VIII. APPLICATION TO SHALY SANDS

As an example, it is helpful to consider a simple shaly sand model taking the form of a quartz matrix, hydrocarbons, formation water and shale. The shale component includes clay minerals, silts and other commonly occurring minerals such as micas, feldspars, evaporites, etc. The silts are defined in terms of their particle size (e.g. diameters from approximately 4 to 60 microns) rather than their mineralogy and, for example, can be quartz, aggregates of clay particles and other materials found in shaly sand reservoirs. The gross reservoir properties in this model are $\vec{x}=(S_w, S_{xo}, \phi, V_{sh}, \rho_h)^T$. The variable $\phi$ is the effective fluid filled porosity. It does not include any porosity associated with clay or silt particles.

The minimum logging suite required for the determination of the aforementioned gross reservoir properties is a gamma-ray, dual-induction (or dual-laterolog), neutron and density log. Optional logs include a spectral gamma-ray and a system from Schlumberger, Inc. known as an Electromagnetic Propagation Tool and identified by the trademark EPT. If the EPT is included in the logging suite, then the EPT derived water saturation ($S_{EPT}$) must be added to the list of reservoir properties to be determined. The saturations then must satisfy the constraint given in (6d). If a spectral gamma-ray is available, then a corrected gamma-ray without uranium counts is utilized. A corrected gamma-ray is a better indicator of shaliness than a total gamma-ray. The potassium and thorium count rates from the spectral gamma-ray are used together with $V_{sh}$ and the neutron and density response equations to determine the volume fractions of clays or other minerals present.

B. Shaly Sand Response Equations

1. Resistivity

The commonly used shaly sand resistivity models include those described in articles by Simandoux, P: "Measures Dielectriques en Milieu Poreaux, Application a Mesure des Saturations en Eau, Etude du Comportement des Masifs Argileaux", Revue de l'institut Francais du Petrole, Supplementary Issue, pp. 193-215, 1963; by Waxman, M.H. and Smits, L.J.M.: "Electrical Conductivities in Oil Bearing Shaly Sands", Soc. Pet. Engr. Journal, Jun. 1968, pp. 107-122; and dual-water described by Clavier, C., Coates, G., and Dumanoir, J: "The Theoretical and Experimental Bases for the 'Dual Water' Model for the Interpretation of Shaly Sands", SPE 6859, Presented at the 52nd Annual Fall Technical Conference and Exhibition of the Soc. of Pet. Engrs., Denver, Oct. 9-12, 1977. For practical log analysis, a Simandoux type model is advantageous since it can be cast in terms of the same set of petrophysical variables which appear in the other response equations. This feature is essential in order to have a fully self-consistent set of response equations. The resistivity response equations are, therefore, written in the form:

$$\frac{1}{R_t} = \frac{V_{sh}S_w}{R_{sh}} + \frac{\phi^m S_w^n}{aR_w} \quad (17a)$$

and $$\frac{1}{R_{xo}} = \frac{V_{sh}S_{xo}}{R_{sh}} + \frac{\phi^m S_{xo}^n}{aR_{mf}} \quad (17b)$$

The first term in the above equations is the conductance contribution attributable primarily to the presence of clay minerals. The use of shale parameters instead of clay parameters in this term probably results in an overestimation of this contribution. The parameters $R_{sh}$ and $R_w$ are examples of zone parameters which must be input by the log analyst. In practice $R_t$ and $R_{xo}$ are determined from the measured responses of a dual-induction or dual-laterolog tool.

2. Gamma-Ray Response Equations

The gamma-ray response function can be written in the form, described by Edmundson, H. and Raymer, L.L.: "Radioactive Logging Parameters for Common Minerals", Transactions of the SPWLA Twentieth Annual Logging Symposium, Tulsa, Jun. 3-6, 1979, Paper O, pp. 1-20:

$$GR = \sum_k C_k (GR)_k, \quad (18)$$

where $C_k$ is the concentration by weight of the k-th radioactive component and $(GR)_k$ is its corresponding gamma-ray reading. The summation in Equation (18) is over all radioactive components. The concentration by weight is given by the equation:

$$C_k = \frac{\rho_k V_k}{\sum_i \rho_i V_i} \quad (19)$$

where $V_i$ is the volume fraction of the i-th component and $\rho_i$ is its density.

The above equations are general and when applied to a shaly sand model result in the gamma-ray response function:

$$GR = \frac{V_{sh}\rho_{sh}(GR)_{sh} + (1 - V_{sh})\rho_{cs}(GR)_{cs}}{\rho_{sh}V_{sh} + \rho_{cs}(1 - V_{sh})} \quad (20)$$

where $\rho_{sh}$, $(GR)_{sh}$, $\rho_{cs}$ and $(GR)_{cs}$ are the bulk density and gamma-ray readings in adjacent shale and "clean sand" zones, respectively.

3. Bulk Density Response Equations

The response function for the formation bulk density log is given by, $$\rho_b = \rho_{mf}\phi + \rho_{ma}(1-\phi-V_{sh}) + \rho_{sh}V_{sh} + \Delta\rho_b, \quad (21)$$

where $\Delta\rho_b$ is the hydrocarbon correction to the density log. Following Gaymard and Poupon, Gaymard, R. and Poupon, A.: "Response of Neutron and Formation Density Logs in Hydrocarbon Bearing Formations", The Log Analyst, Vol. 9, No. 5, Sept.–Oct., 1968, the hydrocarbon correction is in the form:

$$\Delta\rho_b = -A\phi(1 - S_{xo}), \quad (22)$$

where $$A = 1.19(1-\rho_h) + 0.70P_{mf} - 0.032, \quad (23a)$$

for oil bearing zones and, $$A = 1.19 + 0.70P_{mf} - 1.33\rho_h, \quad (23b)$$

for gas bearing zones. In the above equations $P_{mf}$ is the salinity of the mud filtrate in units of ppm $\times 10^{-6}$, $\rho_{sh}$ is the bulk density in an adjacent shale zone, $\rho_{ma}$ is the sand matrix density and $\rho_{mf}$ is the density of the mud filtrate. These are zone parameters which are input by the log analyst.

4. Neutron Response Equations

In neutron logging (epithermal or thermal), the dominant mechanism for the slowing down of fast neutrons emitted by a source in the sonde is inelastic scattering by hydrogen nuclei in the formation. The neutron response, therefore, depends mostly on the "hydrogen index" of the formation and can be written in the form:

$$\phi_n = \phi H_{mf} + (1 - \phi - V_{sh})H_{ma}V_{sh}H_{sh} + (\Delta\phi)_n \quad (24)$$

where $H_{mf}$, $H_{ma}$ and $H_{sh}$ are the hydrogen indexes of the mud filtrate, matrix and shale, respectively. Note that if the neutron log is recorded in sandstone units then $H_{ma} = 0$. The last term in Equation (21) contains both the hydrocarbon and excavation effects on the neutron log and can be written in the form:

$$(\Delta\phi)_n = B\phi(1 - S_{xo}) - (\Delta\phi)_{ex} \quad (25)$$

The coefficient B of the neutron hydrocarbon correction has been derived by Gaymard and Poupon, cited above, e.g.:

$$B = \frac{\rho_h - 0.70 + 0.4P_{mf}}{1 - 0.4P_{mf}} \quad (26a)$$

for oil bearing zones and $$B = \frac{2.2\rho_h - 1.0 + 0.4P_{mf}}{1 - 0.4P_{mf}} \quad (26a)$$

for gas bearing zones.

The excavation effect on the neutron log has been discussed by Segesman, F. and Liu, O: "The Excavation Effect", Transactions of the SPWLA Twelfth Annual Logging Symposium, May 2-5, 1971, pp. 1-24. This effect accounts for the fact that neutron porosities in hydrocarbon zones are observed to be less than can be accounted for by the reduction in the hydrogen index. In shaly formations the excavation effect can be described by the empirical formula:

$$(\Delta\phi)_{ex} = C[0.02\phi' + D(\phi')^{1.8}S_{wh'}] \quad (27)$$

where $$C = 0.2731 \rho_{ma}^{2.1}(1 - S_{wh'}) \quad (28)$$

$$D = 0.6493 + 0.2149 S_{wh'} \quad (29)$$

$$\phi' = \phi + V_{sh}(\phi_n)_{sh} \quad (30)$$

$$S_{wh'} = (\phi S_{wh} + V_{sh}(\phi_n)_{sh}H_{mf})(\phi')^{-1} \quad (31)$$

with, $$S_{wh} = S_{xo}H_{mf} + (1 - S_{xo})H_h \quad (32)$$

In Equations (30 and 31), the quantity $(\phi_n)_{sh}$ is the neutron log reading in an adjacent shale. Approximations for the hydrogen indexes in the above equations can be found again in the Gaymard and Poupon article, e.g.:

$$H_{mf} = 1 - 0.4P_{mf} \quad (33)$$

and $$H_h = \begin{matrix} \rho_h + 0.3, \text{ for oil} \\ 2.2\rho_h, \text{ for gas} \end{matrix} \quad (34)$$

5. Electromagnetic Propagation Tool (EPT) Response Equations

The Schlumberger EPT records the formation traveltime ($t_{pl}$) and relative attenuation ($A_t$) of microwaves (e.g., at 1.1 GHz) which are propagated through the flushed zone immediately adjacent to the borehole. The theoretical basis of these measurements is discussed in Freedman, R. (applicant) and Vogiatzis, J. P.: "Theory of Microwave Dielectric Constant Logging Using the Electromagnetic Propagation Method", Geophysics, Vol. 44, No. 5, May, 1979, pp. 969-986.

The traveltime is the most useful of the aforementioned measurements for formation evaluation. It is assumed that the composite formation traveltime can be expressed as a volume weighted average of the traveltime of the formation constituents and the response equation can then be written:

$$t_{pl} = t_{pw}\phi S_{EPT} + t_{ph}\phi(1 - S_{EPT}) + (1 - \phi - V_{sh})t_{pma} + V_{sh}t_{psh} \quad (35)$$

where $t_{pw}$, $t_{ph}$, $t_{pma}$, $t_{psh}$ are the traveltimes of water, hydrocarbons, matrix and shale, respectively. The traveltimes in the above equation have the units of nanoseconds per meter (ns/m) and they are proportional to the inverse phase velocities of 1.1 GHz microwaves in the respective media. The quantity $S_{EPT}$ is the water saturation within the depth of investigation of the tool. The depth of investigation of the tool depends on the conductivity of the formation within the zone of investigation and also on the thickness and electrical properties of the mudcake. In most practical cases, the depth of investigation is likely to be less than two inches and is, therefore, shallower than that of the neutron or density tools. It has been found, see the examples presented below, that EPT derived water saturations ($S_{EPT}$) are frequently greater than the flushed zone saturations ($S_{xo}$) which affect the neutron, density and $R_{xo}$ measurements. It is, therefore, incorrect to use $S_{xo}$ in the EPT traveltime equation as is often done in the literature.

In the traveltime equation, explicitly included is a shale contribution where $t_{psh}$ is determined from the EPT log traveltime in a shale. This is consistent with and analogous to selecting shale values for $\rho_{sh}$, $(\phi_n)_{sh}$ and $R_{sh}$ from the density, neutron and resistivity readings in a shale. The heretofore published literature on EPT interpretation fails to explicitly include the shale contribution in the traveltime equation. The failure to include this term leads to a lack of self-consistency. The matrix and hydrocarbon traveltimes are constants which can be found in the published literature, such as Delano, J. M., Jr. and Wharton, R. P.: "An EPT Interpretation Procedure and Application in Freshwater, Shaly Oil Sands", J. of Pet. Tech., Oct., 1984, pp. 1763-1771.

The water traveltime ($t_{pw}$) depends on the temperature and salinity of the brine within the depth of investigation of the EPT. It can be related to the real and imaginary parts of the complex dielectric constant. A recent paper, Dahlberg, K. E. and Ference, M. V.: "A Quantitative Test of the Electromagnetic Propagation (EPT) Log for Residual Oil Determination", Transactions of the SPWLA Twenty-Fifth Annual Logging Symposium, New Orleans, Jun. 10-13, 1984, Paper DDD, pp. 1-20, uses an empirically determined Debye model to calculate the complex dielectric constant of water (and, therefore, $t_{pw}$) as a function of temperature and salinity. An assumption is made that the brine within the depth of investigation of the EPT is mud filtrate for which the salinity is known. This assumption is very reasonable considering the very shallow zone of investigation of the EPT tool. This work is used to calculate $t_{pw}$ as a function of mud filtrate salinity and formation temperature.

The attenuation of the EPT signal is caused by the absorption of microwave energy by the formation and the mudcake. Additionally, there is a geometric, "spreading loss" which is caused by the fact that the electromagnetic wave propagated by the EPT is not a plane wave. As a result of these factors, it is difficult to relate the attenuation to the properties of the formation. For this reason, the attenuation measurement is preferably not used in the method of the present invention. One can, however, if required write the following approximate response function:

$$A_t = \phi A_w S_{EPT} + V_{sh}A_{sh} + A_s \quad (36)$$

where $A_w$ is the attenuation of the mud filtrate, $A_{sh}$ is the attenuation of shale and is determined from the log readings, $A_s$ is the spreading loss. All attenuations are in units of decibels per meter (dB/m). In Equation (36), the very small attenuation due to the sandstone matrix and hydrocarbons which might be within the depth of investigation of the EPT is not taken into account. The attenuation due to the mudcake is not included because of lack of knowledge of the thickness and dielectric properties of the mudcake. The mud filtrate attenuation ($A_w$) is calculated as a function of temperature and mud filtrate salinity using the previously referenced work of Dahlberg and Ference. The spreading loss ($A_s$) is computed from an empirically determined relationship derived by Wharton, et al Wharton, R. P., Hazen, G. A. and Rau, R. N.: "Advancements in Electromagnetic Propagation Logging", SPE 9041, Presented at the SPE Rocky Mountain Regional Meeting, Casper, Wyo., May 14-16, 1980:

$$A_s = 45 + 1.3t_{pl} + 0.18t_{pl}^2. \quad (37)$$

IX. CLAY AND NON-CLAY MINERAL ANALYSIS

If a spectral gamma-ray log is available, then an option in the shaly sand analysis permits an analysis of clay and non-clay mineral types. The clay and non-clay mineral analysis is performed after the gross reservoir properties have been determined using the foregoing shaly sand analysis. This clay and non-clay mineral analysis requires the following input at each depth: (1) the $V_{sh}$ determined as above, (2) the shale contributions to the neutron-density log responses determined as above and (3) the theoretical response equations and spectral gamma-ray measurements of the potassium (%) and thorium (ppm) concentrations. The method allows the determination of the volume fractions of five constituents of $V_{sh}$. For example, one could determine the volume fractions of the four clay types (e.g., chlorite, kaolinite, illite and montmorillinite) and one non-clay mineral such as mica, feldspar, etc. Alternatively, if the geological environment is known to preclude one or more clay types then it is possible to determine more than one non-clay mineral. For example, at sufficiently high temperatures montmorillinite would not be present and, therefore, one could then determine the volume fractions of the three remaining clay types and two non-clay minerals.

The clay and mineral determination involves the simultaneous solution of the five following approximate equations:

$$\rho_{sh} V_{sh} \simeq \sum_{k=1}^{n} \rho_k V_k + \ldots \quad (38)$$

$$(\phi_n)_{sh} V_{sh} \simeq \sum_{k=1}^{n} H_k V_k + \ldots \quad (39)$$

$$K \simeq \sum_{k=1}^{n} K_k C_k + \ldots \quad (40)$$

$$Th \simeq \sum_{k=1}^{n} Th_k C_k + \ldots \quad (41)$$

and $$V_{sh} \simeq \sum_{k=1}^{n} V_k + \ldots \quad (42)$$

The above set of five linear equations are to be solved for the n (e.g., $n \leq 5$) volume fractions $V_k$. The solution is subject to the constraints:

$$0 \leq V_k \leq V_{sh} \quad (43)$$

for $k = 1, n$. This is equivalent to a linear programming problem and can be solved by methods analogous to the non-linear programming techniques discussed earlier. Equations (38) and (39) express the shale contributions to the density and neutron log responses in terms of the responses of the shale constituents. In these equations $V_{sh}$ is the shale volume fraction determined by the shaly sand analysis methods discussed above, $\rho_{sh}$ and $(\phi_n)_{sh}$ are the density and neutron log responses in a shale zone, $\rho_k$ and $H_k$ are densities and hydrogen indexes of the constituents. The coefficients $C_k$ are the concentrations by weight of the constituents and are defined in analogy with Equations (19). The Equations (40) and (41) express the concentrations of potassium and thorium determined by the spectral gamma-ray log in terms of the respective concentrations of the radioactive constituents. The last equation is a sum-rule which represents a constraint on the sum of the volume fractions. Note that the incorporation of the sum-rule guarantees satisfaction of the constraint condition of Equation (43).

In the above equations, it has been assumed that the composite formation properties can be represented by the sum of the properties of the constituents. This assumption is probably valid for the radioactive properties of rock formations; however, it would not be valid for the resistivity (and probably the acoustic properties). There is also indicated an inherent uncertainty in all of the equations by the indicated additions of other possible terms. The uncertainty results from the fact that one might not be able to properly specify the constituents which are present or there might be more than five constituents comprising $V_{sh}$. In order to apply the above analysis, it is not only necessary to specify the clays and minerals present but also their properties (e.g., $\rho_i$, $H_i$, $K_i$, and $Th_i$). This adds another element of uncertainty since the physical properties of geological minerals have a statistical distribution. These variations in physical properties depend on various circumstances including but not limited to the degree of hydration and the presence of impurities. The shaly sand analysis set forth above assigns a set of default values to the properties of clay and common non-clay minerals. The default values are determined from the available literature sources, such as the Edmundson and Raymer work previously discussed, and Ruhovets, N. and Fertl, W. H.: "Digital Shaly Sand Analysis Based on Waxman-Smits Model and Log-Derived Clay Typing", Paper presented at the Seventh European Logging Symposium Societe Pour L'Advancement de L'Interpretation des Diagraphies, Paris, Oct. 21–23, 1981. The log analyst has the option, however to override the default and to input other choices for these properties.

X. COMPUTATION OF THE STANDARD DEVIATIONS IN THE LOGGING DATA

The method of the present invention also requires a reasonable specification of the standard deviations in the logging data. All measurements whether they are made in a borehole or a laboratory have limited accuracy. The specification of measurement errors is usually done by introducing "error bars" or standard deviations to indicate the accuracy of the measurement.

In general, there are several sources of errors in logging data. Firstly, there are intrinsic instrumental errors which depend on the design of the logging sonde and the nature of the measurement. In the case of nuclear tools such as the density, gamma-ray, etc., there are statistical fluctuations which are an additional source of uncertainty. These instrumental errors will also depend on logging conditions such as logging speed, ambient pressure and temperature, mechanical vibrations and on the strength of the signal being measured (i.e., signal-to-noise ratio). In addition to the intrinsic errors, there are also calibration errors. The function of logging tool calibrations is to relate the actual signal measurement to the parameter whose value is being measured. For example, in induction logging the actual signals being measured are in-phase (e.g., with respect to alternating currents in the transmitter coils) voltages induced in receiver coils located on the logging sonde. The function of the tool calibrations is to relate these measured voltages to the conductivities of the formations surrounding the borehole. The induction log calibrations generally assume a linear response between a very low and very high conductivity value. Clearly, if the tools are not properly calibrated then the log values of conductivity will reflect the calibration errors. Similar remarks about the importance of proper tool calibration apply to other types of logging tools and their measurements. Other sources of errors are the borehole and environmental conditions which are potentially the most important factors in determining the quality of log data. These factors include hole size, differential caliper (washouts), mud weight, mud conductivity, etc.

The complexity and interplay between the various error sources discussed above renders its essentially impossible for those in the art to formulate a precise or unique algorithm for the specification of standard deviations in logging data. The following relations were developed as a means for reasonably assigning standard deviations to the measurements used in the shaly sand analysis of the present invention set forth above.

The standard deviations in induction log conductivities are written in the form:

$$\sigma(C_l) = \sigma_o(C_l) + \frac{DC}{2000} (C_{mud} - C_l)\theta(C_{mud} - C_l)\theta(DC) + \qquad (44)$$

$$\frac{DC}{2000} \theta(C_l - C_{mud})\theta(DC) +$$

$$\frac{(D-8)}{2000} (C_{mud} - C_l)\theta(C_{mud} - C_l)\theta(D - 8),$$

where $\sigma_o(C_l)$ is the contribution to the standard deviation in $C_t$ due to intrinsic instrumental errors. This contribution is, as indicated, a function of $C_t$. The dependence of $\sigma_o$ on $C_t$ is fairly flat in the conductivity range from roughly 0.0125 to 2 mhos per meter. On either side of this range there is an increase in instrumental errors (and, therefore $\sigma_o$).

The quantity DC is the differential caliper in inches (e.g., the caliper reading minus the bitsize) which is a measure of hole washout. The quantity D denotes the borehole diameter in inches as measured by a caliper log. The function $\theta(x)$ is a unit step function defined such that $\theta(x)=1$ for $x>0$ and $\theta(x)=0$ for $x \leq 0$. The second term in Equation 44 is a contribution to $\sigma(C_t)$ which is present whenever the borehole is washed out and the mud is more conductive than the formation. This term essentially accounts for uncertainties due to borehole and skin-effect contributions to the measurement. The third term is a contribution to $\sigma(C_t)$ which is present whenever the borehole is washed out and the mud is less conductive than the formation. Finally, the last term is a hole size contribution which arises whenever the borehole diameter is greater than 8" and the mud is more conductive than the formation. This term is needed because most corrections applied to induction log conductivities assume an 8" diameter borehole. A similar expression can be developed for the standard deviations in the $R_{xo}$ measurements (e.g., for the shallow focused resistivity measurement on a dual-induction or dual-laterolog tool). The units of $\sigma(C_t)$ are mhos per meter. Note that the standard deviations are determined level by level using the logging data and the borehole environment. In writing Equation 44, the depth index was not included for the sake of brevity.

The standard deviations in the neutron log measurements are written in the form:

$$\sigma(\phi_n) = \sigma_o(\phi_n) + \frac{DC}{200} + \frac{|D-8|}{2000} + \frac{PPG}{300} \qquad (45)$$

where $\sigma_o(\phi_n)$ is the intrinsic error in the measurement. The second term accounts for uncertainty in the neutron log measurements arising from washouts. The third term is a contribution to the measurement which is present whenever the hole diameter is not equal to 8". The last term is a contribution which accounts for the effect of the drilling mud on the neutron measurement. The quantity PPG is the mud weight in pounds per gallon. An expression similar to Equation (45) can be developed for the density log measurement.

The standard deviations in the gamma-ray measurement are written in the form:

$$\sigma(GR) = \sigma_o(GR) + \frac{DC}{2} + \frac{|D-8|}{2} + \frac{(PPG-9)}{2} \qquad (46)$$

where the instrumental error $\sigma_o(GR)$ includes contributions from statistical fluctuations. The second and third terms in Equation (42) are contributions arising from washouts and hole size, respectively. The last term is a correction for mud weight. The units of $\sigma(GR)$ are gamma-ray API units.

The standard deviation in the EPT traveltime measurement are written in the form:

$$\sigma(t_{p1}) = \sigma_o(t_{p1}) + \frac{DC}{2} + \frac{(A_t - 500)\theta}{50} (A_t - 500), \qquad (47)$$

where $\sigma_o(t_{pl})$ is the intrinsic instrumental uncertainty in the traveltime measurement. The second term is a contribution from washouts. Note that there is not a contribution arising from hole size. The last term in the above equation is a contribution which is present whenever the measured attenuation $(A_t)$ exceeds 500 dB/m.

XI. COMPUTER PROGRAM

FIGS. 2-5, inclusive, illustrate a flow chart of a digital computer program for performing the method of obtaining self-consistent measures of parameters indicative of petroleum content according to the present invention. The notations used in the flow charts of FIGS. 2-5 correspond to Section I., NOMENCLATURE, set forth above.

Initial control of the computer 28 is assumed by the computer program with a start instruction 32 after which control is transferred to an instruction 34 causing the computer 28 to open requisite files for the data processing operations to be set forth below.

An instruction 36 then causes the computer 28 to acquire zone parameters originally stored in the data records 22 and provided to the computer 28 through the data input unit 24. Control is then transferred to an instruction 38 which causes the computer 28 to read from the data input unit 24 the zone measurements identified in the response equations of Section XIII. B. above.

An instruction 40 next assumes control of the computer 28, causing an estimate of the uncertainty of the logging measurements obtained to be computed in the manner set forth in the Section X. above, more particularly, Equations 44-47, inclusive.

Control is then transferred to a decision instruction 42 to determine whether or not the end of the data file has been processed. During the initial iteration, a negative response will be generated in response to decision instruction 42, and control is transferred to a decision instruction 44. After the completion of data processing operations at the end of the file, a positive response is generated to a decision instruction 42 and control is transferred to a print answers instruction 46, as will be described below.

Figure 2:
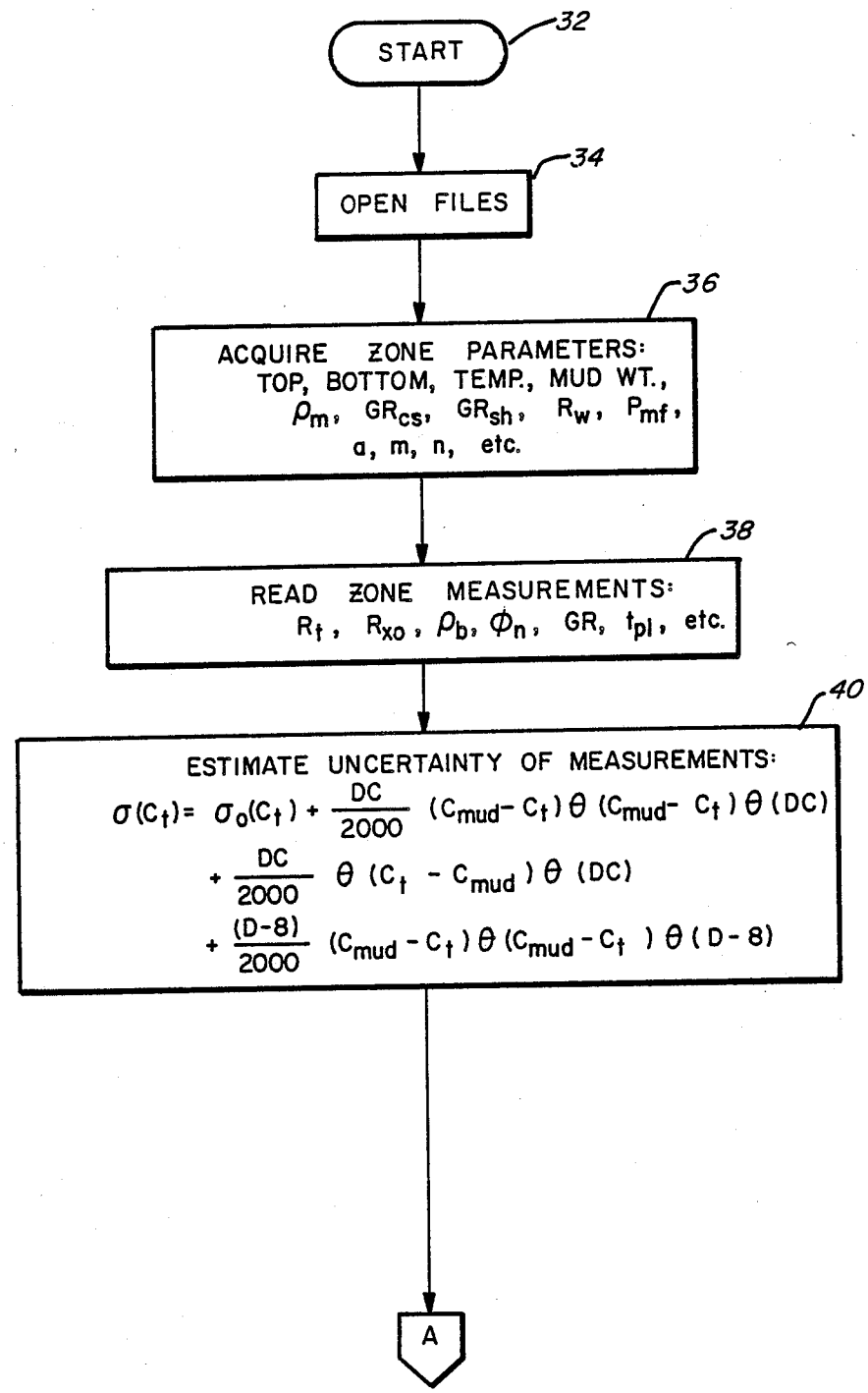
FIGS. 2, 3, 4 and 5 are schematic diagrams of a sequence of steps for controlling the operation of a general purpose digital computer to obtain measures of parameters of interest concerning possible petroleum content of subsurface formations.

Decision instruction 44 (FIG. 3) causes the computer 28 to make an inquiry as to whether the calculations being made are to continue in the same zone, or whether a new zone of geological formation has been reached. In the event that a new zone is indicated in response to decision instruction 44, an instruction 48 assumes control of the computer 28 and causes zone parameters for the new zone to be read in and used in place of those installed in the computer during instruction 36 (FIG. 2). After zone parameters 48 have been read in, or in the event that computations are to continue in the same zone, an instruction 50 assumes control of the computer 28 and causes calculations to be made of the theoretical responses according to the shaly sand response equations, set forth in Section VIII. B., above. Control of the computer 28 is next assumed by an instruction 52 which causes a calculation of the residual vectors in the manner set forth in Section IV. above. An instruction 54 next assumes control of the computer 28 and causes a determination to be made as to which solution set gives the minimum residuals for the formation parameters of interest using the transformation method set forth in Section V. above.

Control is next transferred to a decision instruction 56 to determine whether or not the data analyst wishes to consider adjacent level effects. If adjacent level effects are indicated as not to be considered, decision instruction 56 returns control of the computer 28 to a decision instruction 42. If the analyst has indicated that adjacent level effects are to be considered, decision instruction 56 transfers control of computer 28 to an instruction 58 so that the computer 28 may adjust for adjacent level effects in the manner set forth in Section VII. above.

Figure 3:
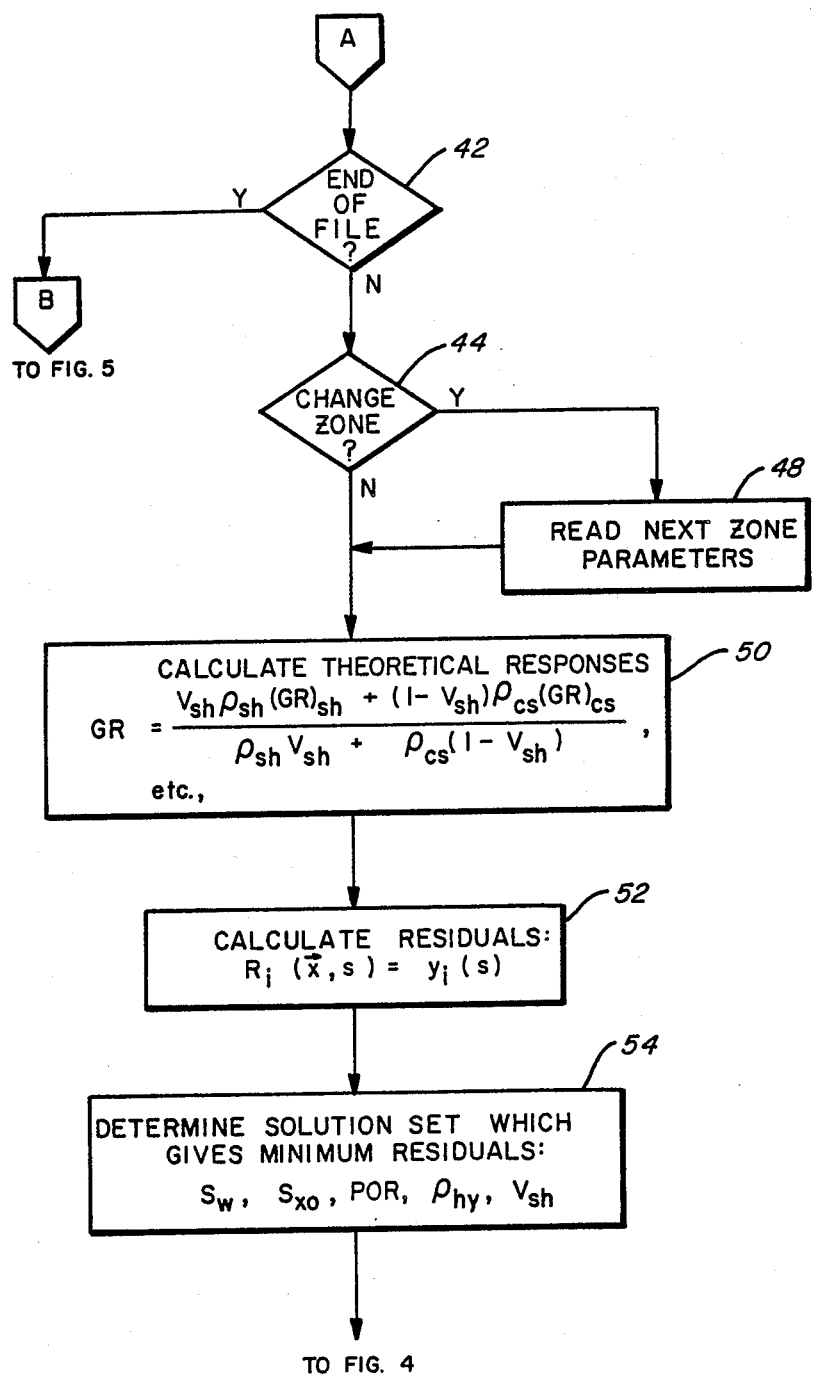
Figure 4:
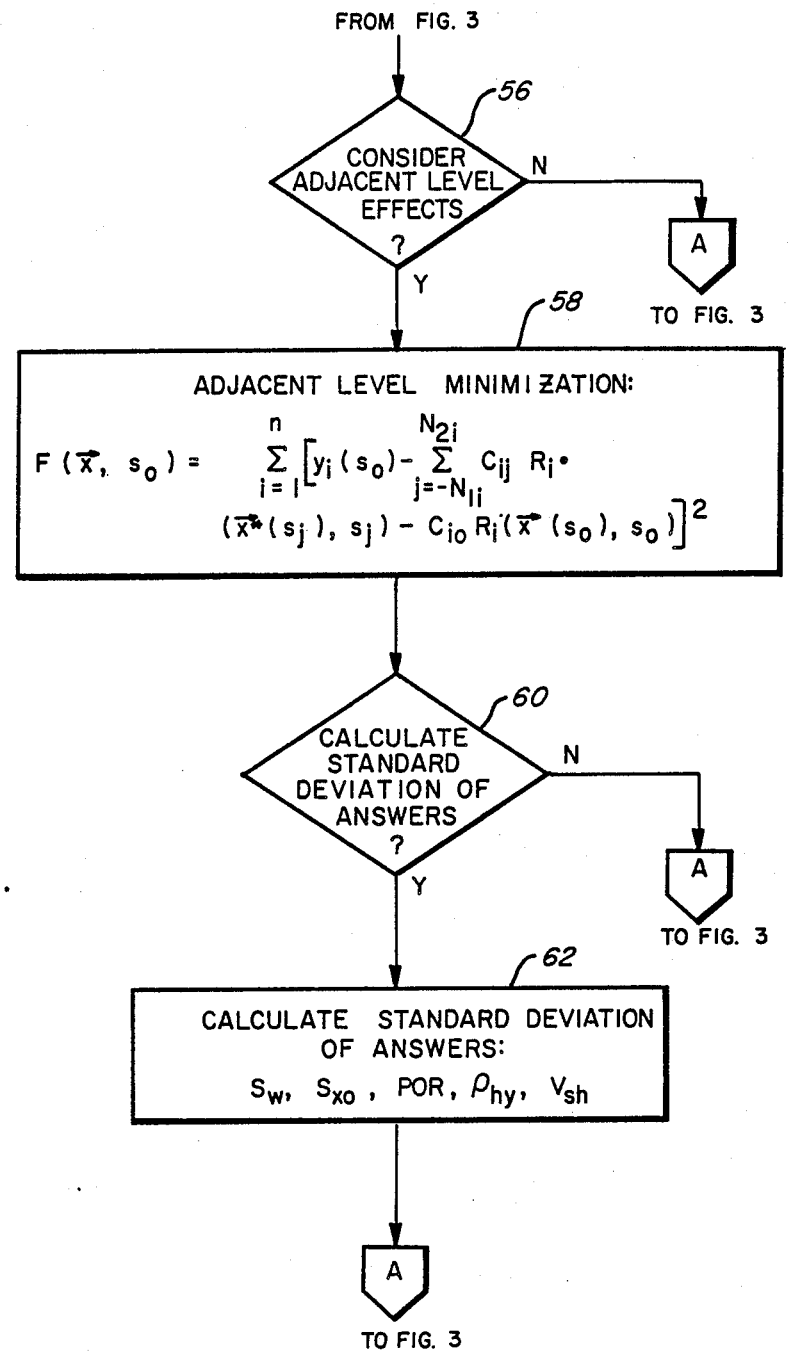
Figure 5:
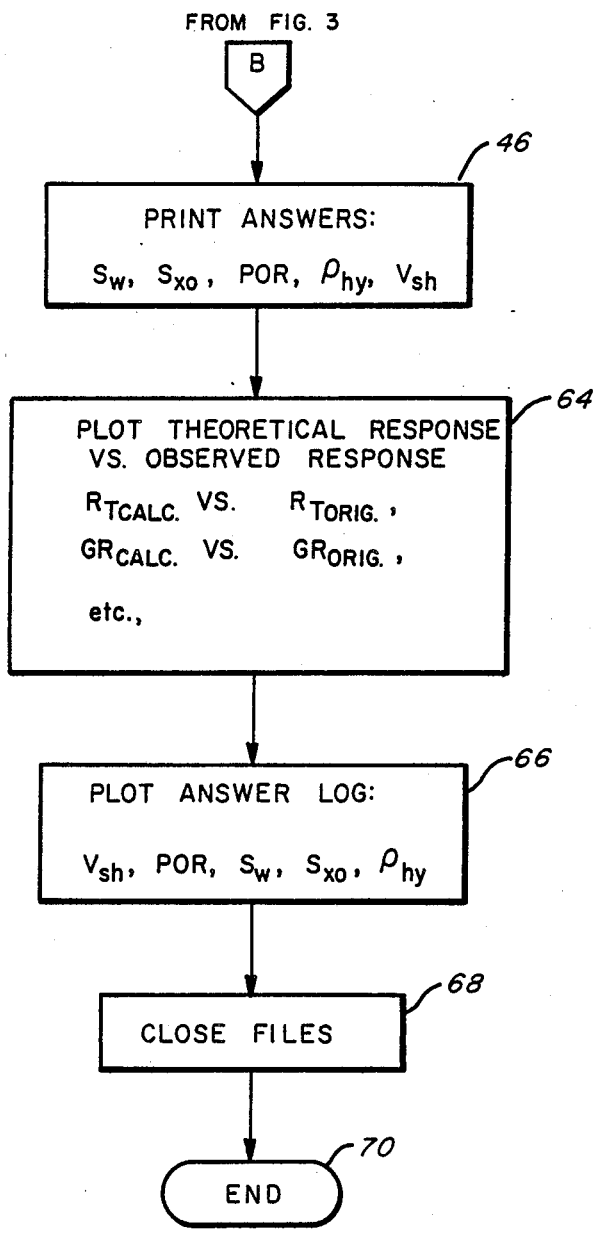

Control is then transferred to a decision instruction 60 so that the computer 28 may determine whether or not the analyst desires for a calculation of the standard deviation of the answers obtained to be performed. If the analyst has not so indicated, control is transferred from the decision instruction 60 to decision instruction 42 (FIG. 3). If the analyst has indicated that a calculation of the standard deviation of the answers is to be obtained, decision instruction 60 transfers control to an instruction 62. Under control of instruction 62, the computer 28 performs a calculation of the standard deviation and the parameter estimates, in the manner set forth in Section VI. above. The calculated results are then stored in the memory of the computer 28. Control is then transferred to decision instruction 42 for continued iterations of the calculations set forth above until other readings for all of the depths in the file being processed are completed. At this time, decision instruction 42 transfers control of the computer 28 to the instruction 46 which causes the computer 28 to print the answers obtained during instruction 54 for each of the data depths of interest in the formation being examined. Control is then transferred to an optional instruction 64 which causes the computer 28 to form an indication on display 30 representing a plot of the theoretical response obtained against the observed responses obtained during well logging. Control is then transferred to an instruction 66 which causes the computer 28 to form, in conjunction with the display 30, logs of the solution sets obtained as a function of depth in the well bore during performance of instruction 54 for each of the depths of interest in the well bore. After performance of instruction 66 control is transferred to an instruction 68 which causes the computer 28 to close the file opened during instruction 34. Control is thereafter transferred to an end instruction 70, completing operation of the computer program according to the present invention.

XII. EXAMPLE SHALY SAND ANALYSIS

As an example of results available with the present invention, an analysis of a Gulf Coast shaly sand formation among others, by the method of the present invention has been conducted. The following steps are performed:

Step 1: The user creates a data file containing the available digital log data in the conventional manner.

Step 2: Check plots of the input data are generated in the usual manner.

Step 3: The check plots of the input data are used to determine zones and zone parameters (e.g., $R_{sh}$, $(\sigma_n)_{sh}$, $t_{psh}$, $\rho_{sh}$, etc.) for the analysis.

Step 4: The computer program of Section XI is then interactively run and the user is asked to specify the zones to be analyzed and the zone parameters (step 36). Also, other petrophysical data such as temperature, mud weight, and mud salinity, etc. which are read from the log headings are specified by the user. The user also specifies whether or not certain special options are to be exercised. For example, the clay analysis is optional and the computation of the standard deviations in the answers is optional. A command file is then generated automatically and is read by the computer program on execution.

Step 5: The program of Section XI is executed, and plots of results are generated.

The above analysis is essentially a "one-shot" effort in the sense that the user is required to interface with the log data only once. This is in contrast to the conventional methods of computerized log analysis where multiple interactions are required because of the piecemeal and multiple pass nature of the conventional methods.

Figure 6:
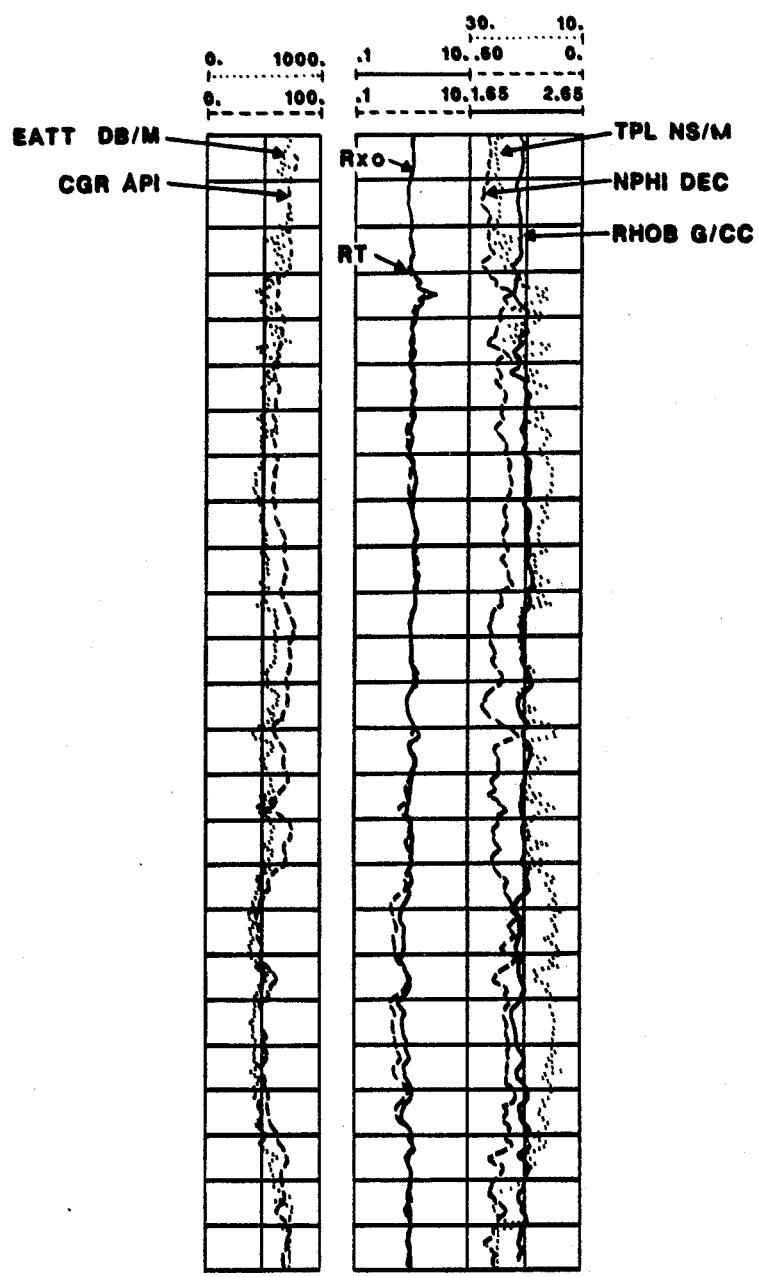
FIG. 6 is a graphical presentation of input data used as a test example with the present invention.

In FIG. 6, the check plots of the input data are shown. The logging suite used in the analysis of this well consisted of a logging tool available from Schlumberger, Inc. and identified by its trademark, Triple Combo. Such a tool provides gamma ray, spontaneous potential, dual-induction, neutron, density and EPT log measurements. The parameters input for this analysis are shown in Table 1 below. A spectral gamma-ray was not available on this well so that no clay mineral analysis could be performed.

Figure 7:
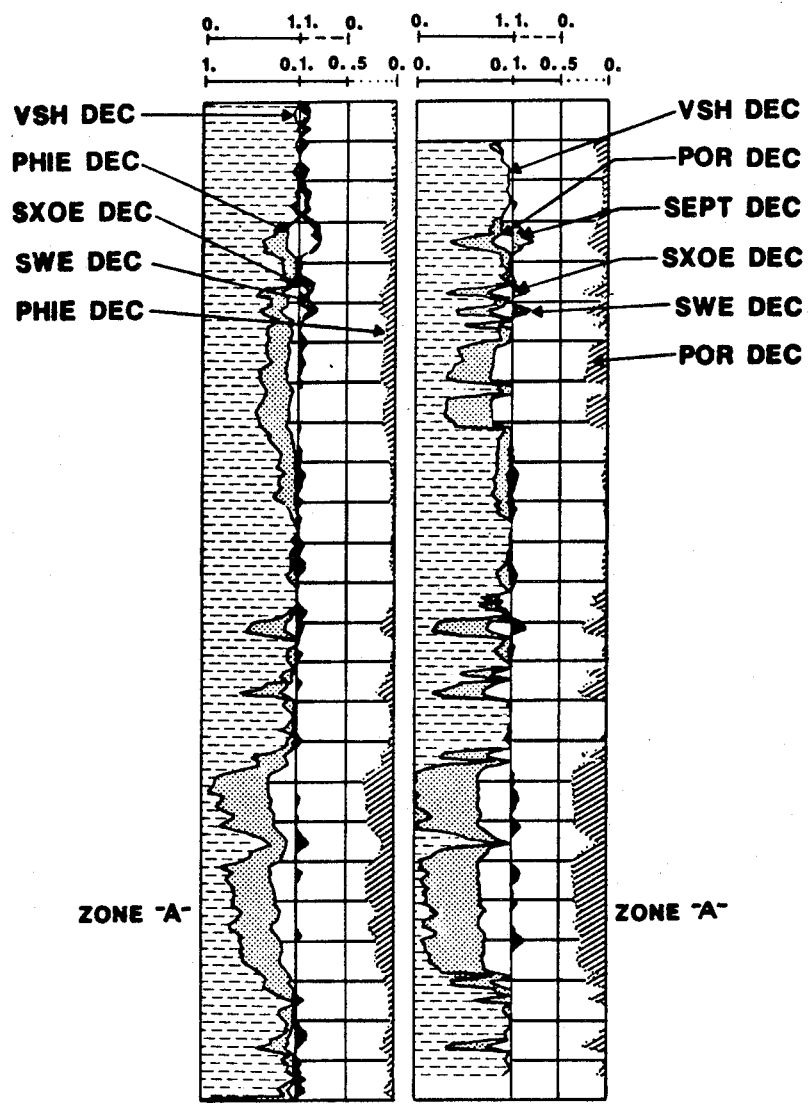
FIG. 7 is a comparison of data plots obtained according to the present invention and by conventional methods.
Figure 8:
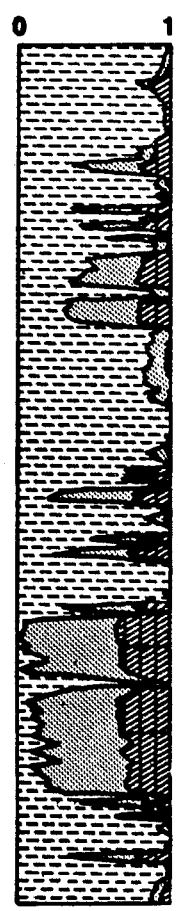
FIGS. 8, 9, 10, 11, 12 and 13, inclusive, are plots of theoretical log data obtained according to the present invention and actual logs from the test example of FIG. 6.
Figure 8:
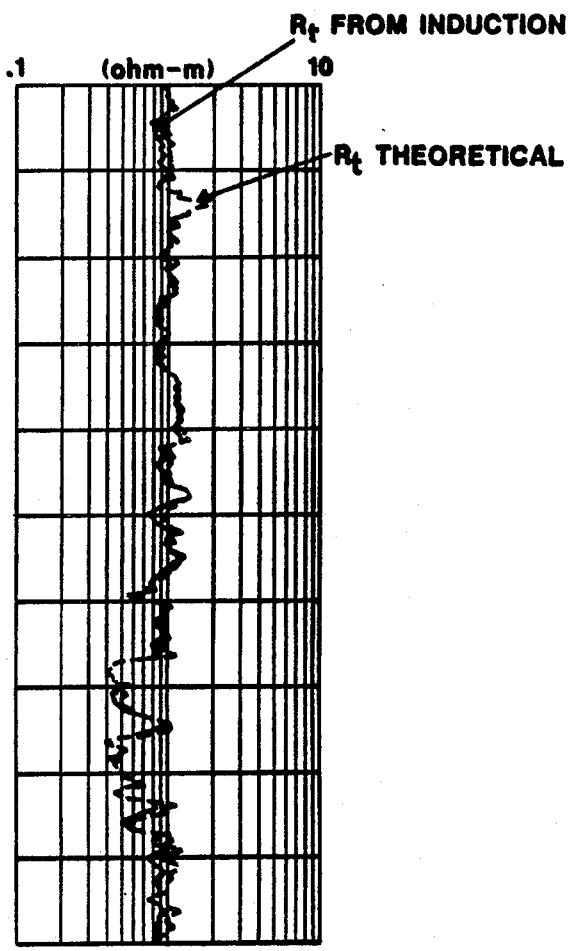
Figure 9:
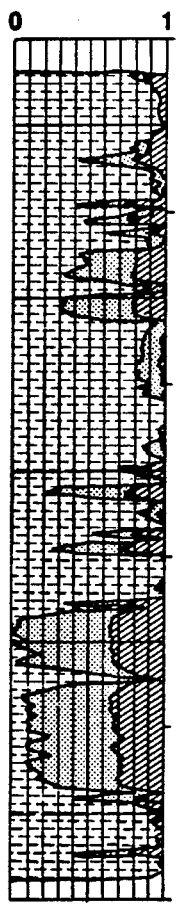
Figure 9:
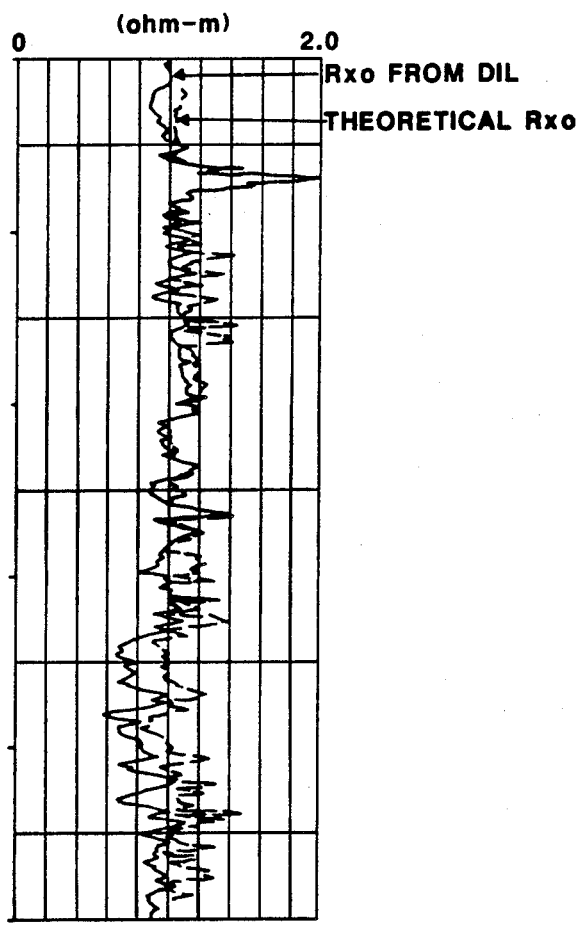
Figure 10:
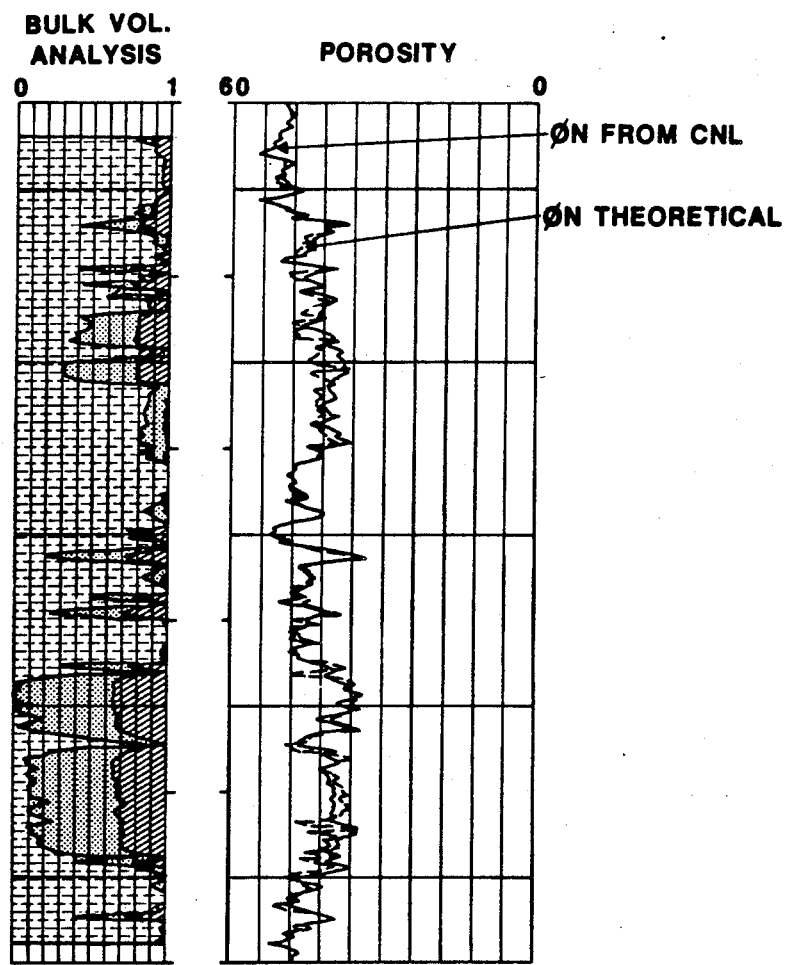
Figure 11:
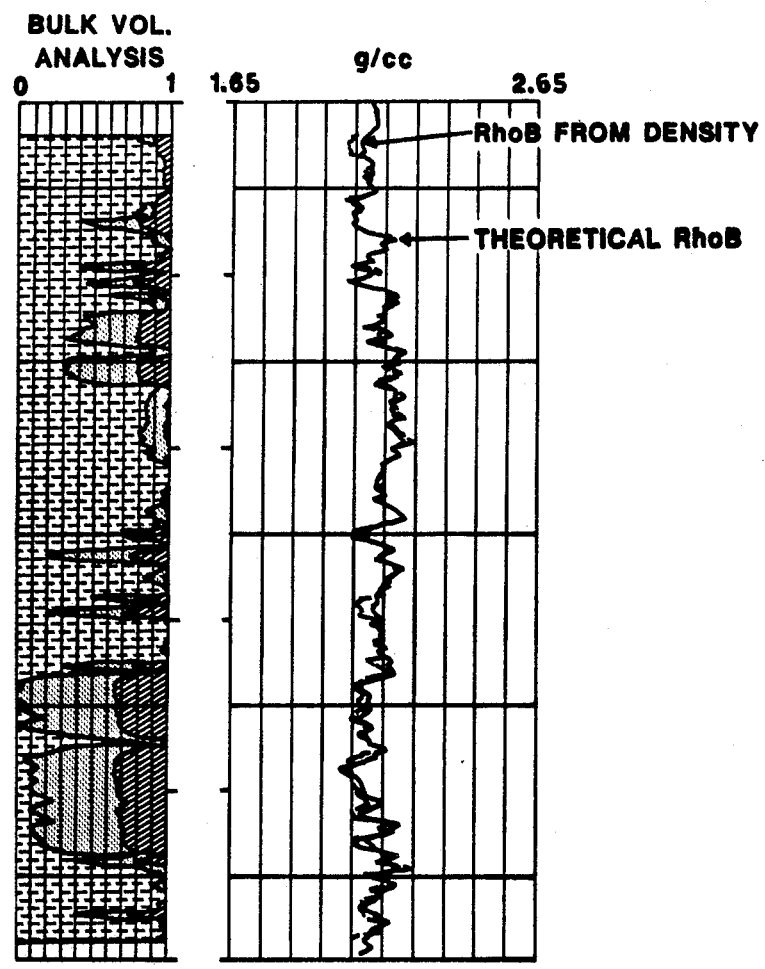
Figure 12:
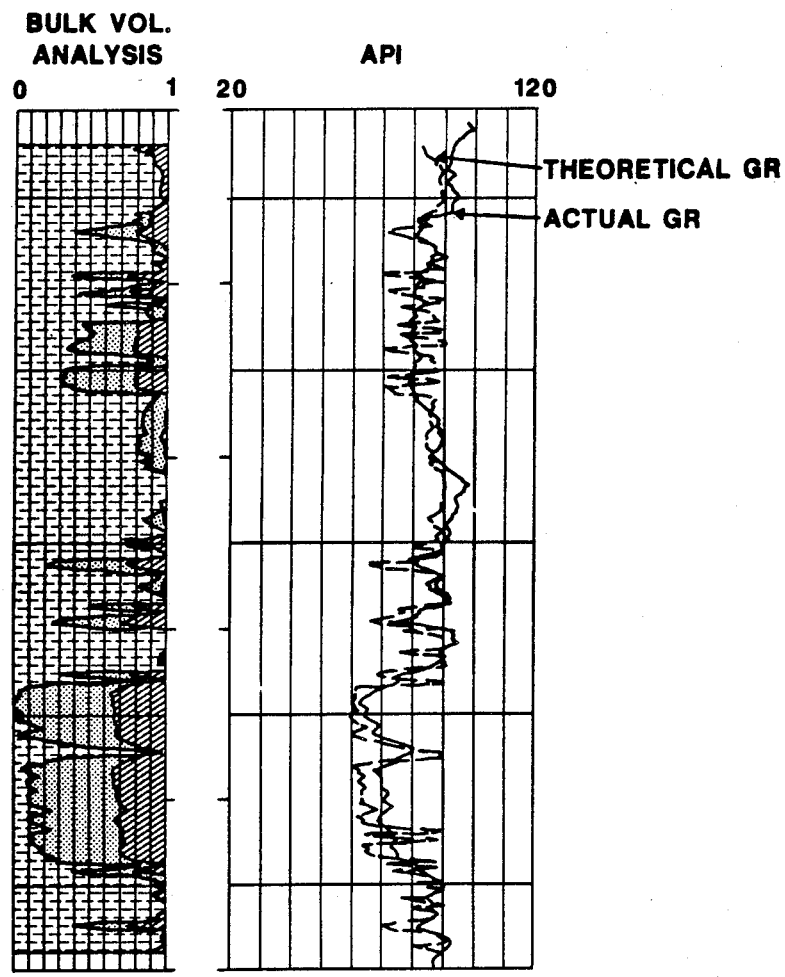
Figure 13:
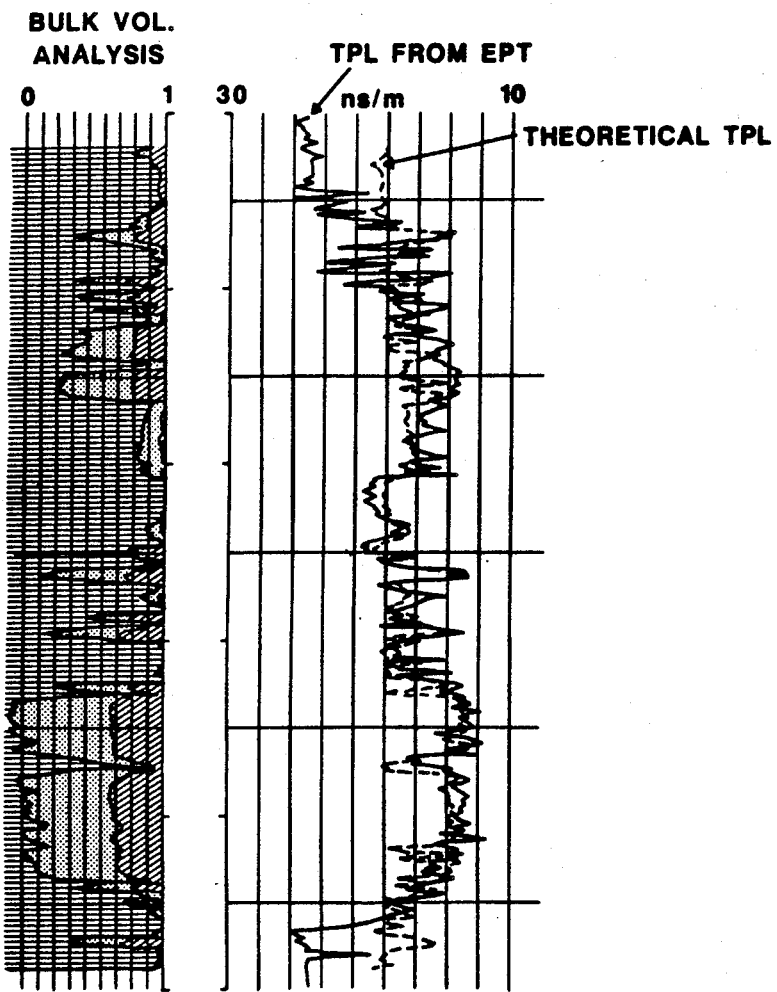

In FIG. 7 is shown a comparison of the reservoir properties determined by analysis according to the present invention with those from a conventional analysis. Note that although the overall character of the two analyses are similar, there are some important qualitative differences. First, analysis according to the present invention provides a sharper delineation of sand-shale sequences than does the conventional analysis. This finer detail and resolution makes it possible to better delineate thin shale laminations and also thinly bedded sands. Observe that there is a significant difference between the results of the present invention and conventional analysis in the geological character of the massive sand (Zone A) interval at the bottom of the section. The analysis results of the present invention reveal a blocky bar sand with fairly uniform porosity and shaliness whereas the conventional analysis indicates a sand with increasing shaliness toward the bottom of Zone A and, therefore, a different depositional environment. Also, note that the analysis results of the present invention indicate higher porosities than the conventional analysis, a result which is more consistent with local knowledge of porosities in this area.

In FIGS. 8 through 13, comparisons are shown of theoretical logs determined by the present invention with the actual log data. The theoretical logs represent the best fit possible of the petrophysical response equations to the log data. Differences between the theoretical and actual logs can be attributed to: (1) errors and statistical fluctuations in the log data, (2) modeling errors in the theoretical response equations and (3) the presence of anomalous minerals or other influences which are not properly accounted for by the model.

Figure 15:
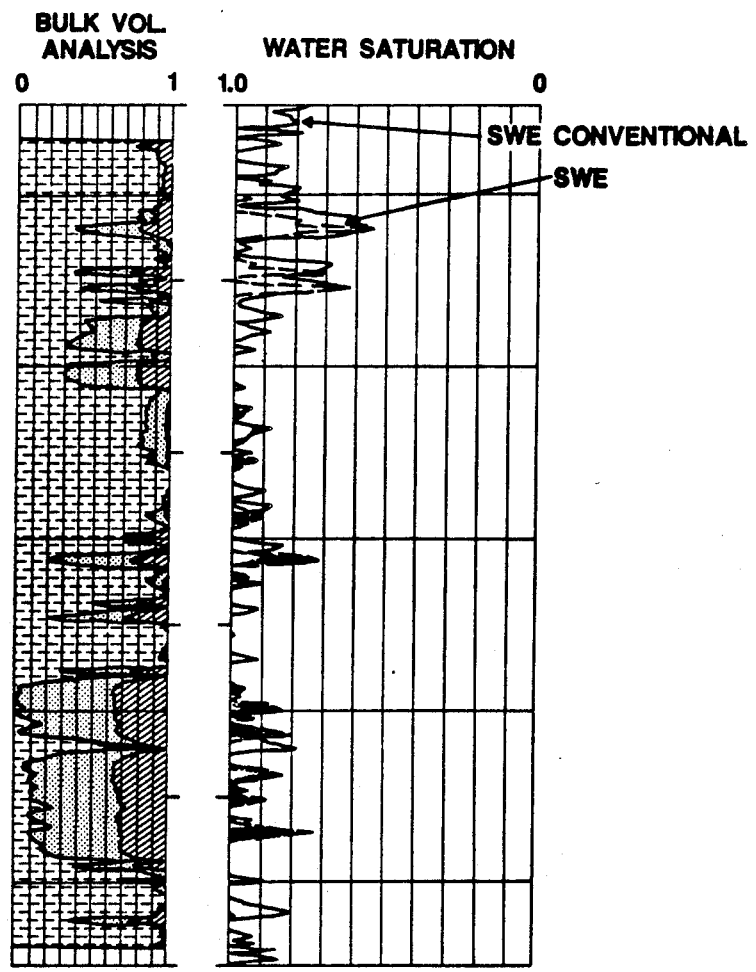
FIG. 15 is a comparative plot of water saturation, with an expanded scale, obtained according to the present invention and by conventional methods from the test example of FIGS. 6 and 7.

In FIGS. 14 and 15, comparisons are shown of porosity and water saturation determined by the present invention and a conventional analysis. The porosity comparison of FIG. 14 clearly demonstrates that the method of the present invention provides a sharper and more detailed picture of the sand-shale sequences than does a conventional analysis.

TABLE 1

| Petrophysical Parameters Input for Analysis of Test Example | |
|---|---|
| Start depth = | 4200 feet |
| Stop depth = | 4700 feet |
| Depth increment = | 0.5 feet |
| Matrix density = | 2.65 gm/cc. |
| Maximum porosity = | 0.35 |
| EPT travel time in matrix = | 7.2 ns/m |
| Gamma-ray in clean sand = | 30 API |
| Bulk density in shale = | 2.10 gm/cc |
| Resistivity in shale = | 1.0 ohm-m |
| Gamma-ray in shale = | 70 API |
| EPT travel time in shale = | 25 ns/m |
| Temperature at start depth = | 95° F. |
| Temperature gradient = | 0.7° F./100' |
| Formation water resistivity = | 0.035 ohm-m |
| Cementation exponent = | 2.15 |
| Saturation exponent = | 2.00 |
| Formation factor coefficient = | 0.62 |
| Bit size = | 12.5 inches |
| Mud weight = | 10.5 PPG |
| Mud conductivity = | 5.6 mhos/m |
| Mud filtrate resistivity = | 0.20 ohm-m |
| Mud salinity = | 6.0 kppm |

XIII. SUMMARY

From the foregoing, it can be seen that the present invention provides a new and improved, log based, formation evaluation system and process. It is an easy to use, and fully interactive, system which is capable of providing the most accurate set of reservoir properties obtainable from a suite of logs. Moreover, the system also possesses a number of important features.

First, it can easily be updated of modified to incorporate new logging devices or interpretation schemes as logging technology advances. During the past ten years, for example, numerous new logging devices have been introduced to measure formation dielectric properties, such as those described in (Delano, J. M., Jr. and Wharton, R. P.: "An EPT Interpretation Procedure and Application in Freshwater, Shaly Oil Sands", J. of Pet. Tech., Oct., 1984, pp. 1763-1771; Berry, W. R., II, Head, M. P. and Mougne, M. L.: "Dielectric constant Logging - A Progress Report", Transactions of the SPWLA Twentieth Annual Logging Symposium, Tulsa, Jun. 3-6, 1979, Vol. II, Paper VV, pp. 1-26; Huchital, G. S., Hutin, R., Thoraval, Y and Clark, B.: "The Deep Propagation Tool (A New Electromagnetic Logging Tool)", SPE 10988, Presented at the 56th Annual Fall Technical Conference, San Antonio, TX., Oct. 5-7, 1981); natural gamma-rays (such as those described in Serra, O., Baldwin, J. and Quirein, J: "Theory, Interpretation and Practical Applications of Natural Gamma Ray Spectroscopy", Transactions of the SPWLA Twenty-First Annual Logging Symposium, Lafayette, Jul. 8-11, 1980, Paper Q, pp. 1-30); gamma-ray spectral properties (such as those described in Gilchrist, W. A., Jr., Quirien, J. A., Boutemy, Y. L. and Tabanou, J. R.: "Application of Gamma-Ray Spectroscopy to Formation Evaluation", Transactions of the SPWLA Twenty-Third Logging Symposium, Corpus Christi, Jul. 6-9, 1982, Paper B, pp. 1-28); nuclear magnetism (such as those described in Herrick, R. C., Couturie, S. H. and Best, D. L.: "An Improved Nuclear Magnetism Logging System and Its Application to Formation Evaluation", SPE 8361, Presented at the 54th Annual Technical Conference, Las Vegas, NV., Sept. 23-26, 1979) and other physical properties of petroleum reservoirs. A modern log interpretation system should be able to easily incorporate these new measurements into its evaluation scheme.

A second important feature is the capability of the system to recognize and account for varying degrees of log data quality. This permits reasonable assignment of standard deviations to the logging data based upon borehole and environmental conditions. These standard deviations can then be used on a level-by-level basis to assign reasonable weights to the various measurements comprising a logging suite. This permits each piece of logging data to be given its proper influence in the evaluation scheme.

A third feature, too often neglected in petrophysical evaluations, is the capability to reasonably assess the standard deviations in the computed reservoir properties. These uncertainties in the computed answers (e.g., $S_w$, $S_{xo}$, $V_{sh}$, $\phi$, etc.) result from the uncertainties in the logging data and also from the approximate nature of the petrophysical response equations. This feature is especially important in determining confidence levels in reserve estimates, cash flows and other exploration and production economic considerations which depend upon a quantitative knowledge of reservoir properties.

A fourth feature which is a by-product of method of analysis according to the present invention is the ability to calculate a suite of synthetic or theoretical logs (FIGS. 8 through 13). These synthetic logs represent the best fit of the actual logging data to the petrophysical response equations employed in the present invention for a specified set of zone parameters (e.g., input parameters such as $R_w$, $R_{mf}$, $(GR)_{sh}$, $(GR)_{cs}$, $c_{mud}$, etc.). Poor agreement between actual logs and the corresponding synthetic logs is usually indicative of: (1) bad log data and/or, (2) improper choice of zone parameters and/or, (3) the presence of some unexpected mineral, as for example, pyrite which would perturb the resistivity and bulk density measurements. Thus, this feature provides the user with visual diagnostic information which enables an assessment of the validity of the interpretation.

The foregoing disclosure and description of the invention are illustrative and explanatory thereof, and various changes in the size, shape and materials, as well as in the details of the illustrated construction may be made without departing from the spirit of the invention.

We claim:

1. A method of obtaining self-consistent measures of parameters indicative of petroleum content from measurements obtained in subsurface formations adjacent a well bore, comprising the steps of:
    (a) obtaining, from one or more well logging instruments in a well borehole, measurements indicative of reservoir properties of the formations adjacent the well borehole;
    (b) storing the measurements so obtained in a data memory;
    (c) establishing a set of response equations in which the measurements obtained are expressed as functions of the parameters indicative of petroleum content;
    (d) constraining each of the parameters indicative of petroleum content to have a self-consistent value, namely that its contribution to the measurements is based on the same value for the parameter, in its effect where such parameter is present through the set of response equations;

(e) calculating theoretical response values for the measurements obtained using an array of test sets of values for the constrained parameters indicative of petroleum content;

(f) obtaining a measure of the difference between the measurements obtained and the calculated theoretical response values for each of the array of test sets of values;

(g) determining which one of the array of test sets of values produces the minimum measure of difference between the measurements obtained and the calculated theoretical response values to thereby ascertain the values of measures of parameters indicative of petroleum content; and (h) forming an output display of the ascertained values of measures of parameters indicative of petroleum content.

2. The method of claim 1, wherein one of the parameters indicative of petroleum content comprises:
water saturation.

3. The method of claim 2, wherein one of the parameters indicative of petroleum content comprises:
water saturation of an uninvaded formation.

4. The method of claim 2, wherein one of the parameters indicate of petroleum content comprises:
water saturation of a flushed formation zone adjacent the well bore.

5. The method of claim 1, wherein the parameters indicative of petroleum content comprises:
rock volume fraction.

6. The method of claim 5, wherein the parameters indicative of petroleum content comprises:
shale volume fraction.

7. The method of claim 1, wherein one of the parameters indicative of petroleum content comprises:
formation porosity.

8. The method of claim 1, wherein one of the parameters indicative of petroleum content comprises:
hydrogen index of the formation.

9. The method of claim 1, wherein a particular subsurface formation is of interest, and further including the step of:
compensating for the effect of adjacent levels on the measurements obtained in the particular formation of interest.

10. The method of claim 1 wherein the measurements obtained include:
measurements obtained from a resistivity logging tool.

11. The method of claim 1 wherein the measurements obtained include:
measurements obtained from a gamma-ray logging tool.

12. The method of claim 1 wherein the measurements obtained include:
measurements obtained from a density logging tool.

13. The method of claim 1 wherein the measurements obtained include:
measurements obtained from a neutron logging tool.

14. The method of claim 1 wherein the measurements obtained include:
measurements obtained from a electromagnetic wave logging tool.

15. The method of claim 1, further including the step of:
performing a mineral analysis of the formations of interest from the measurements obtained in them.

16. The method of claim 1, further including the step of:
forming a measure of the standard deviation of the ascertained values of the measures of parameters.

17. The method of claim 1, further including the step of:
forming a log as a function of borehole depth of at least one of the array of test values which produces the minimum measure of difference.

18. The method of claim 17, wherein at least one of the array of test values includes:
a resistivity log test value.

19. The method of claim 17, wherein at least one of the array of test values includes:
a neutron log test value.

20. The method of claim 17, wherein at least one of the array of test values includes:
a density log test value.

21. The method of claim 17, wherein at least one of the array of test values includes:
a gamma-ray log test value.

22. The method of claim 17, wherein at least one of the array of test values includes:
an electromagnetic wave log test value.

23. The method of claim 17, further including the step of:
obtaining a measure of the standard deviation of the ascertained values of measures of the parameters of interest.

* * * * *